United States Patent [19]

Onozaki

[11] Patent Number: 6,026,378
[45] Date of Patent: Feb. 15, 2000

[54] WAREHOUSE MANAGING SYSTEM

[75] Inventor: Nobuhiko Onozaki, Funabashi, Japan

[73] Assignee: CNET Co., Ltd., Chiba Prefecture, Japan

[21] Appl. No.: 08/985,683

[22] Filed: Dec. 5, 1997

[30] Foreign Application Priority Data

| Dec. 5, 1996 | [JP] | Japan | ................................. 8-340506 |
| Apr. 14, 1997 | [JP] | Japan | ................................. 9-111976 |
| Sep. 3, 1997 | [JP] | Japan | ................................. 9-254197 |
| Sep. 3, 1997 | [JP] | Japan | ................................. 9-254198 |

[51] Int. Cl.[7] .............................. G06F 15/24; G06F 15/46
[52] U.S. Cl. .................................. 705/28; 705/8; 705/29
[58] Field of Search ................................ 705/1, 7, 8, 10, 705/22, 28, 29; 345/962; 701/24

[56] References Cited

U.S. PATENT DOCUMENTS

| 4,419,734 | 12/1983 | Wolfson et al. | ........................ 364/567 |
| 4,621,325 | 11/1986 | Naftzger et al. | ........................ 364/406 |
| 4,879,650 | 11/1989 | Kurimoto et al. | ........................ 364/405 |
| 5,038,283 | 8/1991 | Caveney | ................................. 364/403 |
| 5,113,349 | 5/1992 | Nakamura et al. | ........................ 364/478 |
| 5,443,534 | 8/1995 | Vinciarelli et al. | ........................ 29/593 |
| 5,467,285 | 11/1995 | Flinn et al. | ............................ 364/478 |
| 5,666,493 | 9/1997 | Wojcik et al. | ............................ 705/26 |
| 5,834,706 | 11/1998 | Christ | ....................................... 177/1 |

*Primary Examiner*—Allen R. MacDonald
*Assistant Examiner*—Susanna Meinecke-Diaz
*Attorney, Agent, or Firm*—Rabin & Champagne, PC

[57] ABSTRACT

Upon receipt of an article in a warehouse, an article code put on the article and a location code put on a shelf loading the article are stored as management data through scanning. In addition, as the management data are stored, a manufacturing date, a lot number related to the article and the number of a pallet used for moving the article. Consequently, using those data, the host computer carries out a variety of warehouse management tasks, which enables first-in and first-out warehouse management and accurate shipping management using a terminal connected to the host computer, thus reducing use of paper such as an article slip and/or an article order.

5 Claims, 32 Drawing Sheets

| ARTICLE CODE | LOCATION CODE | RECEIPT DATA | MANUFACTURING DATA | LOT NUMBER | QUANTITY |
|---|---|---|---|---|---|
| | | | | | 100 |
| | | | | | |
| | | | | | |

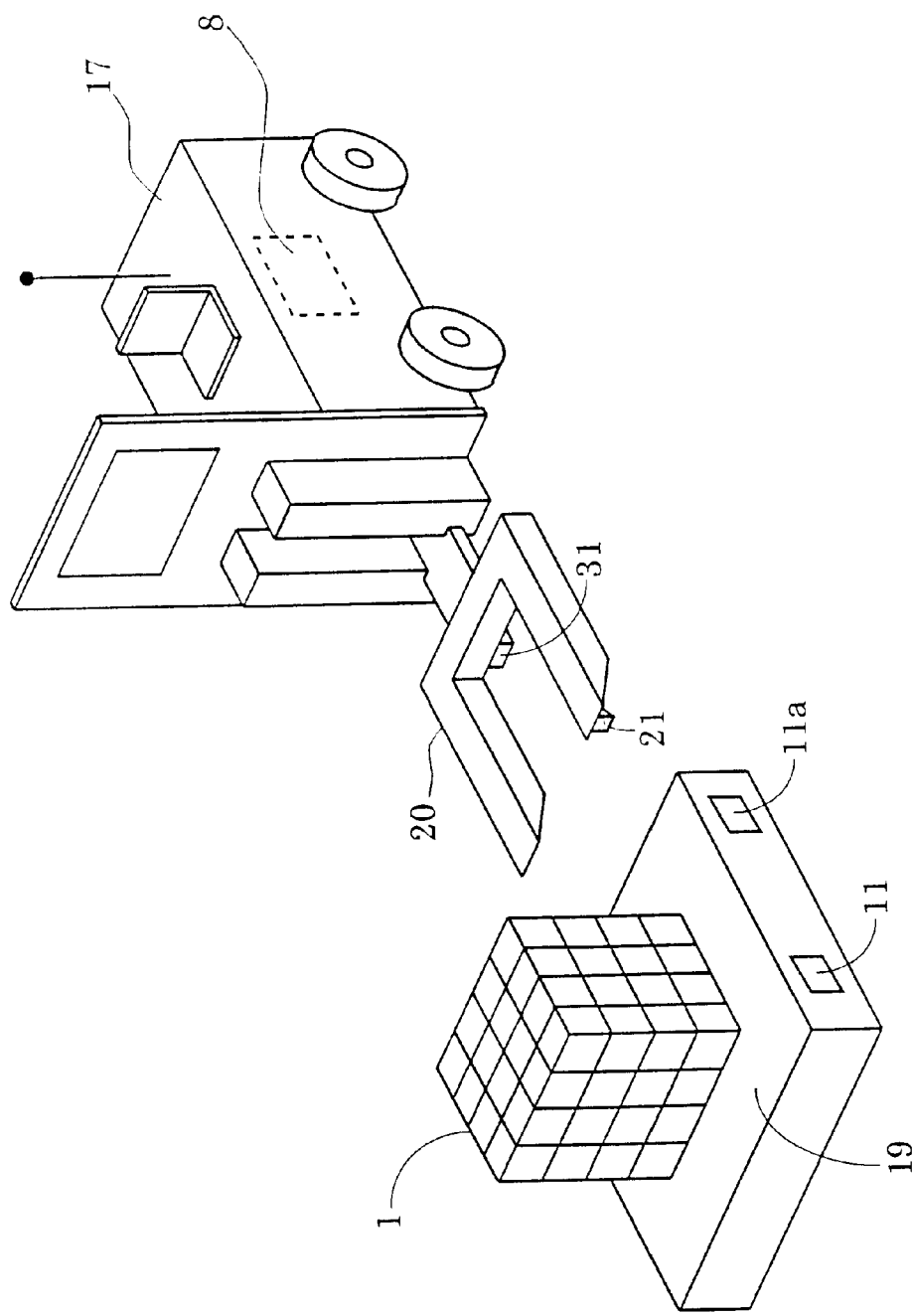

| ARTICLE NAME | CUSTOMER | QUANTITY | UNIT WEIGHT | VOLUME |
|---|---|---|---|---|
| | | | | |
| | | | | |
| | | | | |

(b)

| TRUCK NAME | DRIVER | MAXIMUM LOADAGE | VOLUME |
|---|---|---|---|
| | | | |
| | | | |
| | | | |

(c)

| TRUCK NAME | ROUTE | ARTICLE NAME | CUSTOMER | LOADAGE |
|---|---|---|---|---|
| | | | | |
| | | | | |
| | | | | |

(a)

(b)

| ARTICLE | PRICE | QUANTITY |-50
|---|---|---|
| NOTEBOOK | ¥120- | 60 |
| BINDER | ¥400- | 35 |
| | | |

(a)

(b)

(a)

(b)

(a)

(b)

WAREHOUSE MANAGING SYSTEM

BACKGROUND OF THE INVENTION

1. Field of the Invention

The present invention relates to a warehouse managing system which automatically manages a procedure from arrival of articles at a warehouse to their delivery therefrom to reduce use of paper.

2. Description of Prior Art

There has existed an automatic warehouse which receives and ships articles according to a schedule. The automatic warehouse determines in detail how to store the articles, and how to move or ship the articles in order. Also, the automatic warehouse is provided with a variety of tools such as a lifter, a lift truck, and a conveyer, thus moving and shipping the articles efficiently. The automatic warehouse requires a large amount of equipment cost. On the other hand, the automatic warehouse, in general, has many shelves, wherein operators receive, move, and ship the articles to/between/from the shelves, for example, using lifters with reference to slips.

FIG. 1 shows a flow of articles in a general warehouse. As shown in the diagram, for example, once received, the several articles 1 are identified referring to a slip through checking of their article name and their quantity. Once received, the articles 1 are piled up on the preselected shelves 3 in the warehouse 2. Thereafter, some checking such as storage place checking, freshness checking, and quantity checking, are carried out referring to the slip.

To determine the number of articles 1 remaining in the warehouse 2, an inventory is taken periodically. To avoid reducing of the freshness of the articles 1, the shipment is carried out in such a fashion that an earlier received article 1 is earlier shipped (i.e., first-in, first-out). In this way, the truck 4 delivers the articles 1 to customers such as wholesalers and retailers.

Incidentally, in the above conventional warehouse, if the articles are stored in wrong storage places, the warehouse management such as receiving purchase orders and maintaining article freshness does not work. In addition, since in general, the inventory involves much manpower, warehouse operation such as receiving, storing, moving, and shipping the articles, are not efficiently performed during the inventory.

Further, determination of the quantity and the destination for the articles 1, and operation such as picking up and delivering the articles 1 are performed in article shipment. Such determination and operation requires complex knowledge and experience, and may induce some mistakes. Also, storing the received articles 1 in the preselected places makes it difficult to simultaneously store some received articles more than usual and other received articles less than usual.

Moreover, in general, counting up stacked small articles such as parts, paper, and books is difficult. More definitely, for example, the following are commonly used: (1) weighing papers using a scale, and converting the weight into a numerical quantity; and (2) taking out a part of a box containing a plurality of parts, weighing the part, weighing the parts in total, and estimating the number of the parts based upon the weight of one part. These operations, however, are rather difficult to operators, which might result in some input errors or calculation errors. That is to say, these operations impede accurate management of warehousing.

Further, allocating some trucks and assigning a variety of and a large number of articles thereto with reference to several slips is extremely difficult for even skilled operators. For this reason, there has been developed some computer systems which are capable of calculating the amount of those articles based upon the slips by destination of the trucks, thus assisting the operators. Rearranging assignment of the articles to the trucks in detail sometimes requires replacing and changing data on the trucks, the articles, and the destination, being troublesome to impede reduction of operation time. Further, once picked up from the warehouse, the articles are packed into some conveyance boxes each directed to a destination for delivery. Accordingly, to each store, several conveyance boxes are delivered with some contents list indicative of information on the articles. After unpacking the conveyance boxes, the clerk in a store checks the quantity of the articles contained therein looking at the list. Checking the articles with reference to the lists is extremely difficult, which might burden the operator with many jobs in case of delivery of a great number of articles. In particular, prior to checking quantity of the articles, it is necessary to unpack the conveyance boxes and to confirm whether or not the articles correspond to the article order, which makes receipt operation of articles extremely complicated.

Further, conventionally, in case of delivery of a large number of articles to a department store or a supermarket, the clerks working therein have checked and arranged the articles to attach tags thereto. Attaching the tags to the articles employs a labeler. The labeler prints tags showing prices of the articles to let them out one by another for the purpose of attaching them on the articles. In arranging the articles on the shelves, each clerk puts on the articles the tags corresponding thereto using the labeler.

In such a tag processing system, to make the labeler print prices on articles, the clerks manually inputs the prices to the labeler, thus starting to put price tags on the articles. However, if a clerk causes an error in checking the types of the articles or inputting the prices, wrong price tags are put on the articles. Besides, putting on a great number of articles the corresponding price tags must involve many clerks and many labelers, which increases jobs of the clerks and makes management of the labelers complicated.

Further, to pick up and deliver articles from the warehouse according to article orders made by customers, some instructions are prepared. The instructions show names and quantities of the articles. Warehousing is required to ship the articles in such a fashion that older articles are scheduled to be shipped earlier than new ones, in general, which is referred to as first-in & first-out management.

In particular, for articles which are easy to be decayed with time, it is essential to clarify articles to be picked up according to the shipment instructions. Accordingly, automated warehouses manage the names, quantities, and manufacturing dates of the articles for such first-in & first-out management.

Incidentally, some conventional warehouses are attempting to instantly indicate receipt and shipment of articles, which arise frequently, more definitely, articles to be stored after the receipt of shipment. For example, however, the shipment instructions for shipment of the articles is prepared on the basis of stock information upon receipt of article orders from the customer, which sometimes makes it impossible to actually ship the articles at the present time because the articles have been shipped. This is due to the time lag between the time of preparing shipment instructions and the time of actually shipping. This requires preparing for other shipment instructions, which makes shipment operations complicated.

SUMMARY OF THE INVENTION

It is therefore an object of the present invention to provide a warehouse managing system which comprises a terminal which reads a location code, the location code being attached on a storage place and being representative of the storage place, and an article code attached to each of the articles, and is used for inputting article information including the quantity of the articles; and a host computer which prepares management data denoting a relation between the article code and the location code based on the article information and carries out management of receipt or shipment of the articles.

BRIEF DESCRIPTION OF THE DRAWINGS

FIGS. 17(a)–(c) are explanatory diagrams showing a variety of data used for the third embodiment;

DESCRIPTION OF THE PREFERRED EMBODIMENTS

Hereinafter, the preferred embodiment of the warehouse managing system according to the present invention will be now described with reference to the accompanying drawings.

<First Embodiment>

Figure 1:
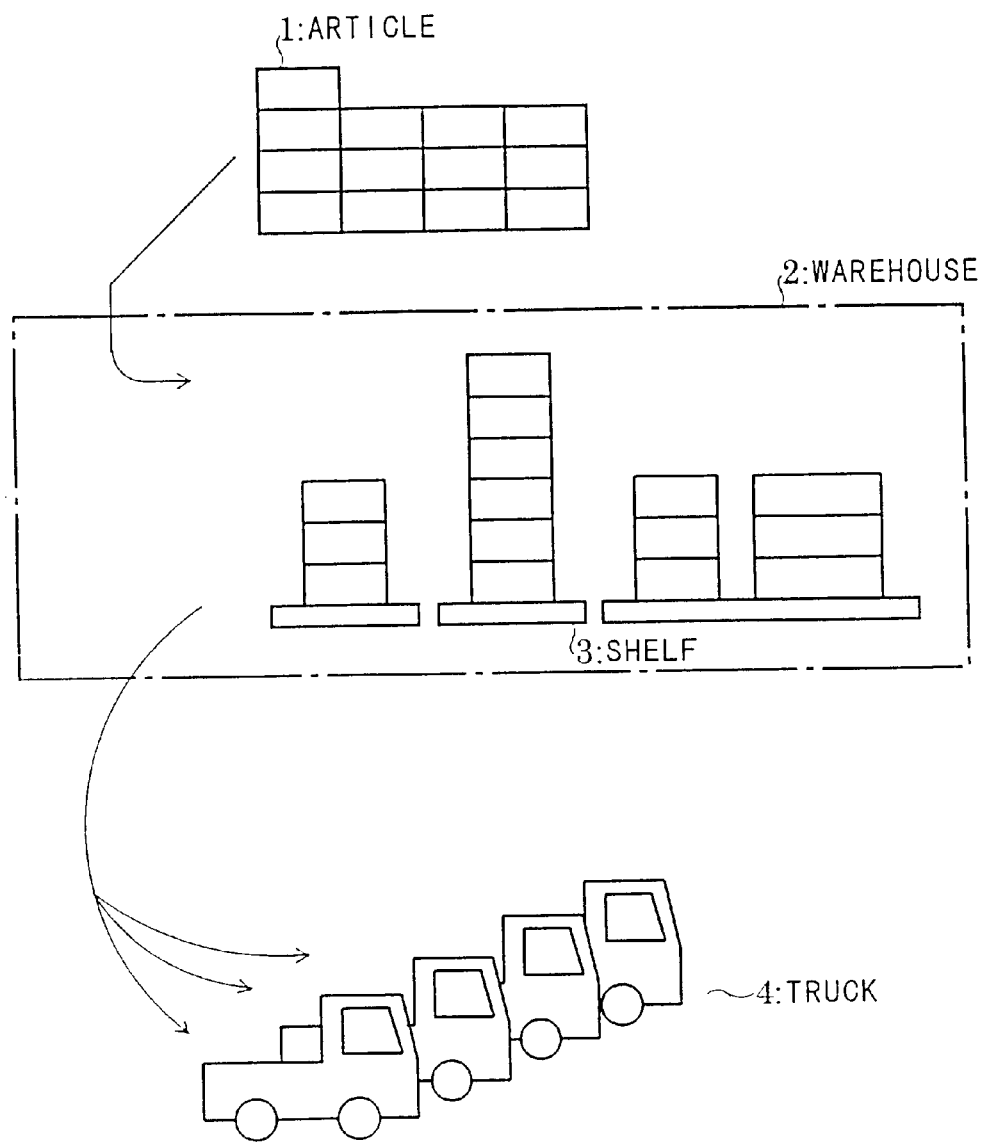
FIG. 1 shows a flow of articles in a general warehouse.
Figure 2:
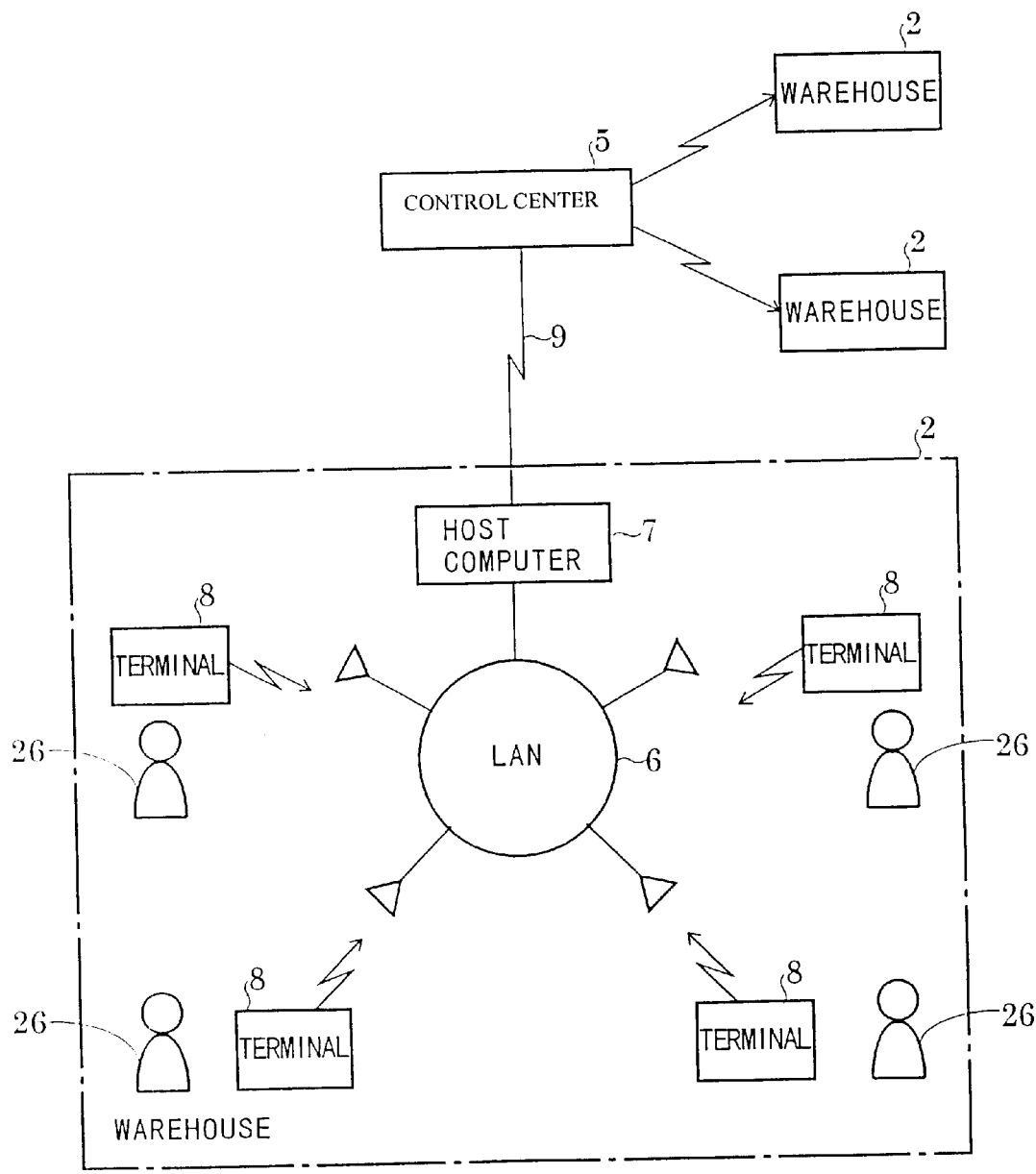
FIG. 2 is a schematic block diagram showing the warehouse managing system of the first embodiment.

FIG. 2 is a block diagram showing a warehouse managing system of the present invention. In the figure, the control center 5 is, for example, a calculation center which centrally controls articles stored in a warehouse located in each area. The control center 5 communicates with, for example, the warehouse 2 via the communication line 9 such as a telephone line. The warehouse 2 is provided with the host computer 7 and a plurality of terminals 8, wherein the host computer 7 and the terminals 8 are connected with each other via the radio LAN (Local Area Network) 6, and the terminals 8 are handled by the operators 26. The host computer 7 manages the articles stored in the warehouse 2, wherein the management is carried out through processing information on receiving and shipping the articles, which has been given by the control center 5. The host computer 7 gives instructions for receiving, moving, and shipping of the articles to the terminals 8, whereby the operators receive the instructions. On the contrary, the operators send a variety of information on the articles from the warehouse to the host computer 7 using the terminals 8.

Figures 3A, 3B:
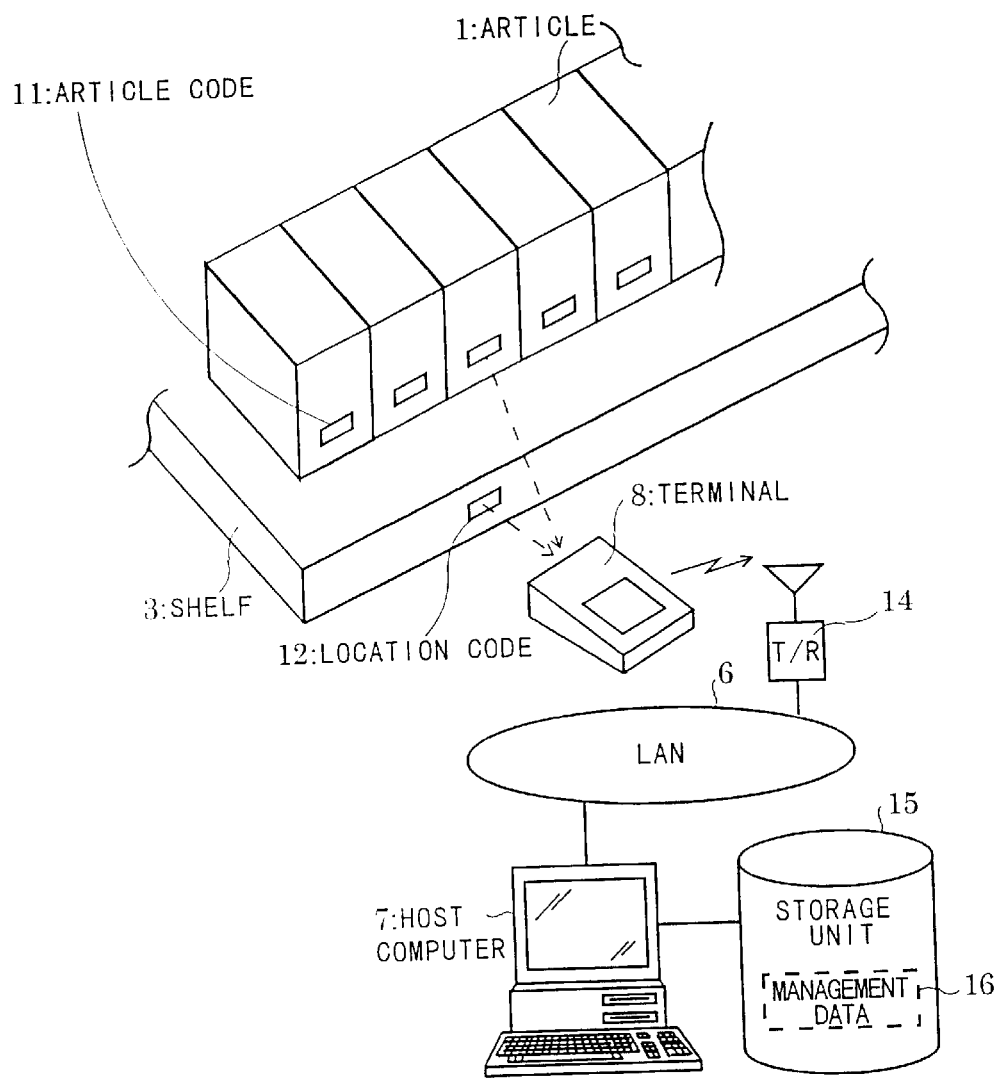
FIGS. 3(a) and (b) show a receipt operation of articles.

FIG. 3(a) shows a schematic diagram showing a managing system when receiving articles. The flow of receiving the articles in the managing system is as follows. First, after receipt of the articles 1, the terminal 8 reads the article code 11 attached to the articles 1, and it further reads the location code 12 attached to the shelf 3, when the articles 1 are stacked thereon. The terminal 8 sends the read data to the host computer 7 via the transceiver 14 positioned in the warehouse and the radio LAN 6. The location code 12 on the shelf 3 denotes the position of the shelf 3, which for example, incorporates a bar-code. The article code 11, for example, incorporates a commonly available ITF code. Any other codes are available for these codes 11 and 12 as long as they are easily readable.

The terminal 8 converts the data read out of the article 1 and the location code 12 into a signal. The signal is transmitted to the transceiver 14 through radio transmission, to reach the host computer 7 via the radio LAN 6. The host computer 7 is installed with the storage unit 15, such as a hard disk, wherein the storage unit 15 stores the management data 16. As shown in FIG. 3 (b), the management data 16 includes the article code, the location code, the receipt date, the manufacturing date, the lot number, and the quantity for each article 1. For example, assuming that one hundred articles are received, the number "100" is input as the quantity, and the article codes, location codes, and receipt dates of the articles are input likewise. Moreover, the manufacturing dates, the lot numbers, and other information on the articles, which have been contained in the ITF code, are stored as the management data 16. Utilizing the management data enables a determination of which type of articles are stored, or which shelves store the articles at any time.

Figure 4:
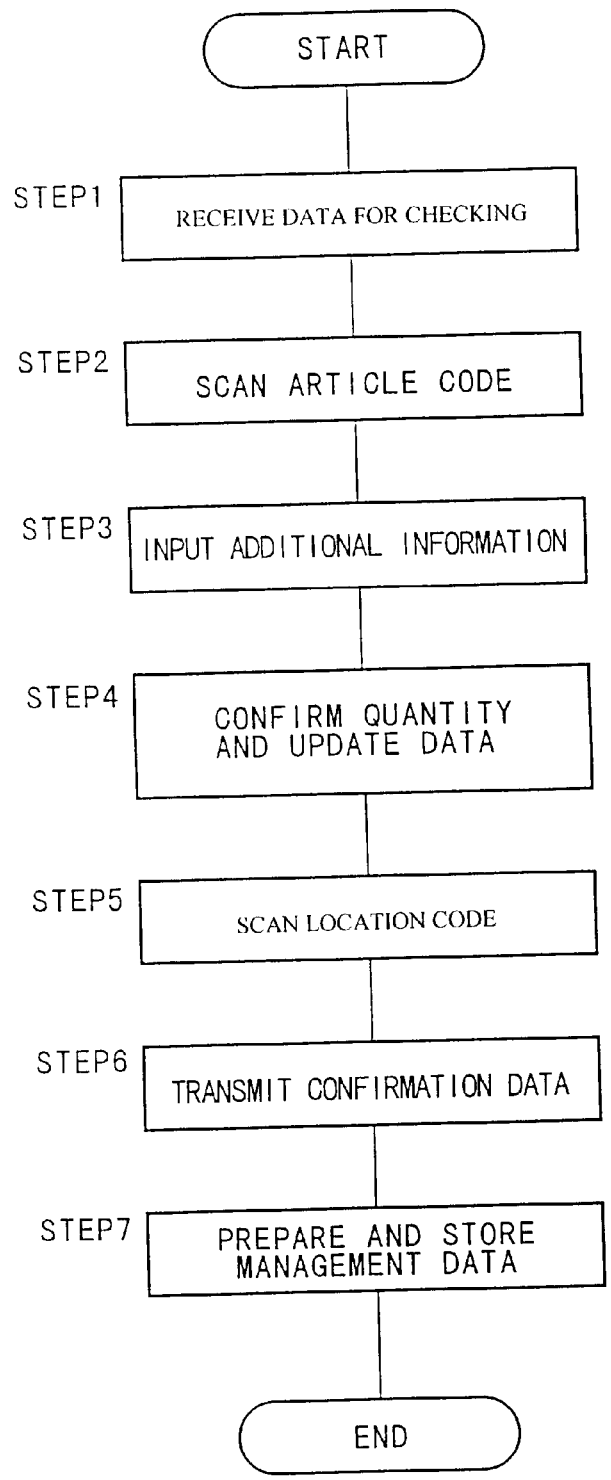
FIG. 4 is a flowchart of the receipt of articles.

FIG. 4 is a flowchart which shows the operation of receiving articles, in which the steps 1~6 show the operation of the terminal, while the step 7 shows the operation of the host computer. At the step 1, the terminal receives the data for checking. The data for checking is equivalent to the conventional slip, which contains information on the quantity of the articles and the contents thereof. These data are indicated on the display of the terminal. At the step 2, one of the operators scans the article code using the terminal. Subsequently, the operator inputs additional information on the articles, at the step 3. This inputting may be performed using a bar-code, or by manual operation with keys with reference to items recorded in the articles. At the step 4, the quantity of the article is confirmed, and the quantity is updated if necessary. At the step 5, the location code is scanned to designate the shelf for storing the articles, which notifies the host computer of the shelf in which the articles are to be stored. At the step 6, the terminal notifies the host computer of completion of these processes and the confirmation of information on the articles through transmitting confirmation data. In this way, the operation of the operator is completed. Upon receipt of such data, the management data shown in FIG. 3(b) is prepared and stored at the step 7.

This allows management such as managing for each manufacturing data or managing for each location of the articles. Further, the host computer can determine the shelf where the articles are stored, which permits accurate management of the quantity of the articles, and management for maintaining their freshness. If an article is transferred from a shelf to another shelf, instant updating of the location code thereof enables avoidance of troubles which might accompany such a transference.

Accordingly, this warehouse management does not require the conventional complicated method of stacking and storing the articles in the warehouse referring to the layout showing the arrangement of the articles in article order or in receipt order, which facilitates managing the warehouse. Further, the operator can receive instructions at the display of the terminal, whereby complicated and special knowledge on the warehousing becomes unnecessary. Moreover, slips issued for each article or for each lot of the articles are not necessitated in warehousing, thus facilitating the management of the warehouse.

The article codes have been commonly used for approximately 98% of the articles at the present time. If not available, codes such as bar-codes may be attached to articles at receipt thereof. Managing the articles by combining location data, manufacturing dates, and availability period, makes it possible to accurately determine the location of the articles wherever they are piled up. Furthermore, transmitting data on receipt and shipment of the articles from the terminal via the radio LAN enables real-time warehouse managing.

Figure 5:
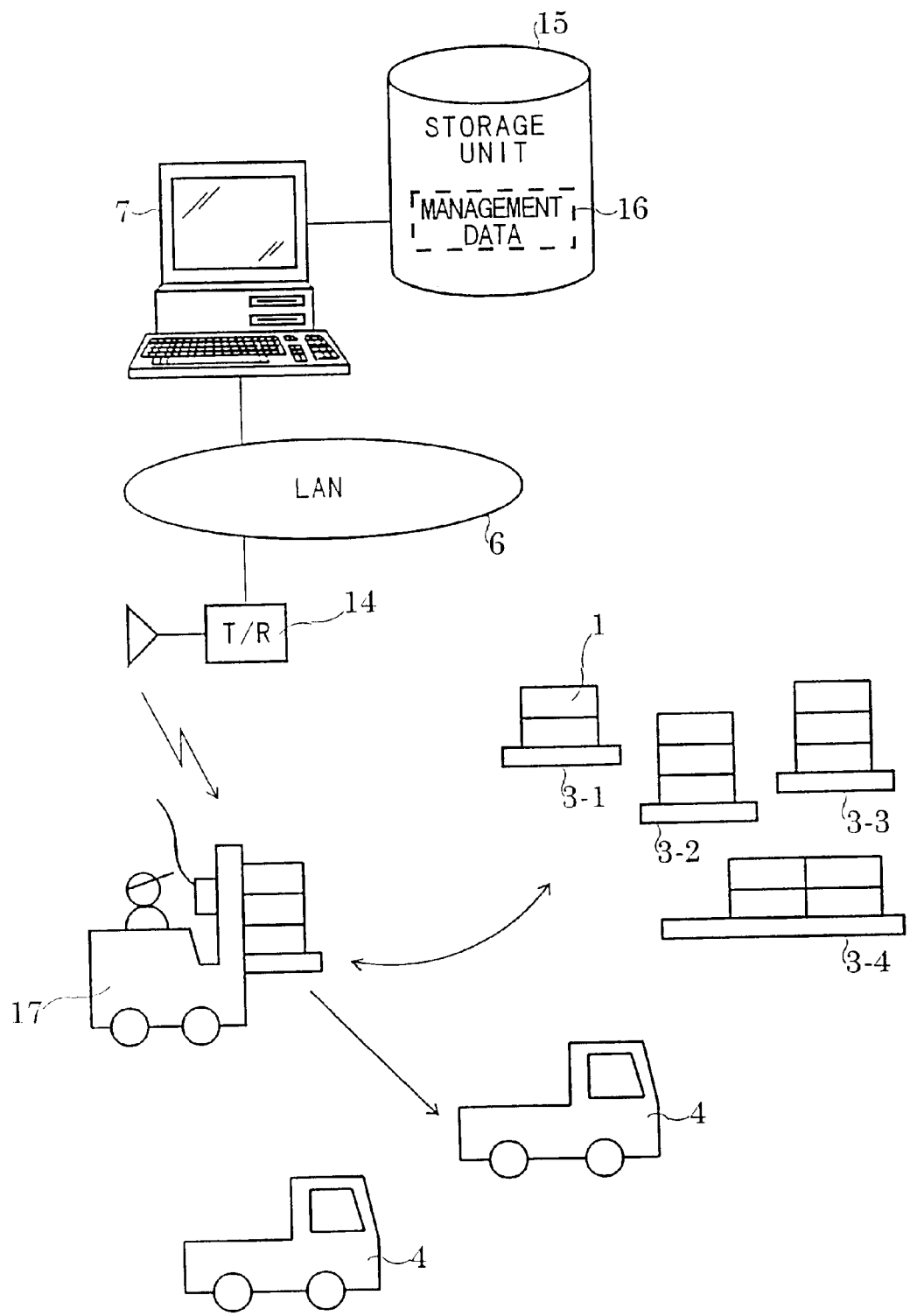
FIG. 5 is a schematic block diagram showing a managing system.

Hereinbelow, the process of picking articles will be now described. FIG. 5 is a schematic block diagram showing a managing system. As shown in the diagram, the host computer 7 prepares instructions after reading out the management data 16, to notify the terminal 8 of the instructions via the radio LAN 6. The instructions includes the article code, the location code, the quantity, and the destination, or the customer. The operator receives the instructions, and withdraws certain articles from the shelf using a forklift pursuant to the instructions, for example. Next, the operator moves the articles to trucks directed to respective destinations. In such a sequential operation, the operator receives at the terminal the instructions sent from the host computer 7, and moves the articles referring to the article code and the location code involved therein, which enables accurate picking.

Figure 6:
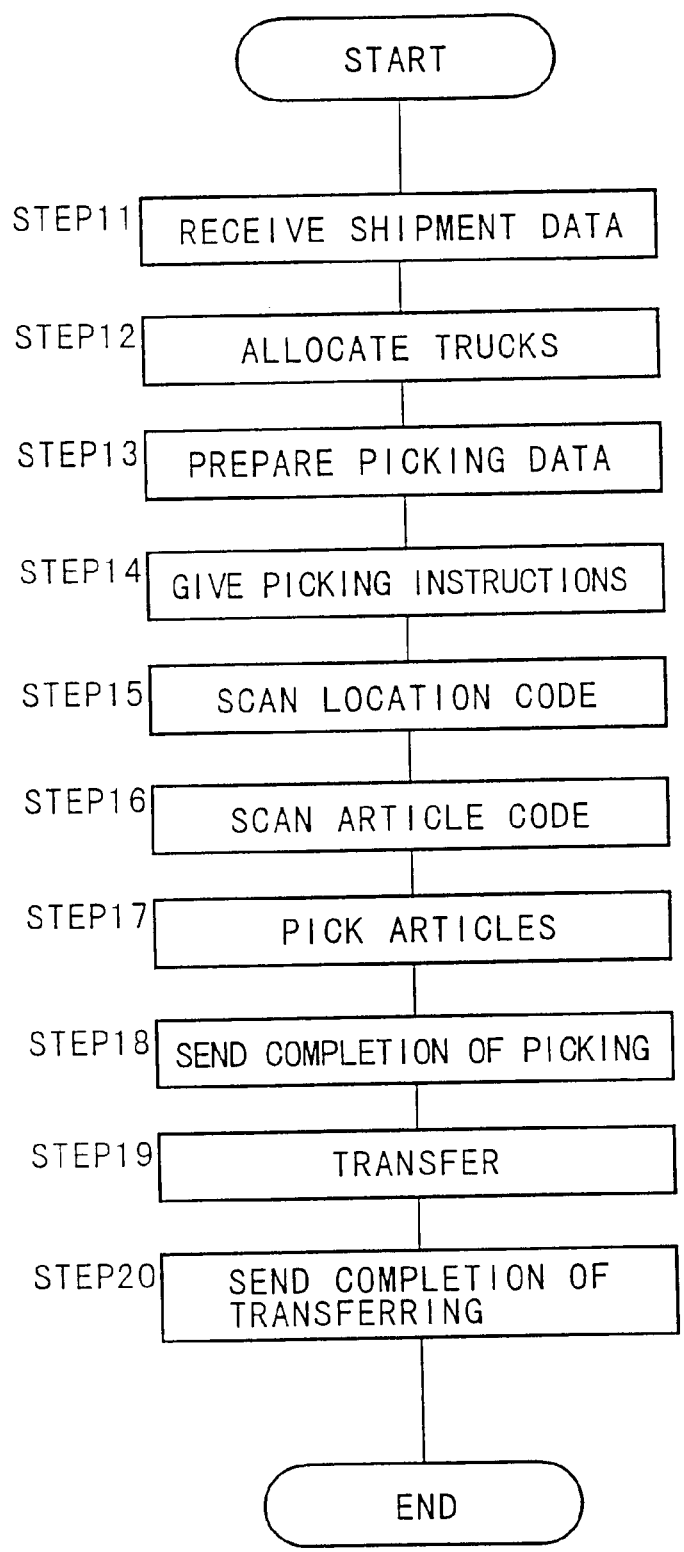
FIG. 6 is a flowchart of the picking operation.

FIG. 6 is a flowchart showing the picking operation, wherein the steps 11~14 denote the operation of the host computer while the step 15~20 denotes the operation of the terminal. At the step 11, the host computer 7 receives the data necessary to ship articles from the control center 5. At the step 12, the operator at the host computer 7 inputs data for allocating the trucks. At the step 13, data for picking are prepared, which indicate what kind of articles should be shipped, and how many articles are shipped. At the step 14, the host computer gives the terminal the picking instructions, which include the article code, the location code, the quantity, and the destination shown in FIG. 3(b).

At the step 15, the operator at the terminal scans the location code on the shelf specified by the picking instructions. Further, the operator scans the articles code on the articles stacked on the shelf, at the step 16. When the picking is correctly completed, the host computer gives other instructions, whereby the operator starts to pick articles pursuant to the picking instructions using a forklift. At this time, the operator picks articles corresponding to the number specified by the picking instructions, whereas the operator notifies the host computer of completion of picking for confirmation through transmission of picking completion data, at the step 18. At the step 19, the operator transfers the articles to the trucks. Finally, the operator notifies the host computer of completion of transferring, at the step 20. In this way, the process of shipping the articles from the warehouse is completed.

In the above system, the host computer gives the instructions for the type, the quantity, and the shelves of the articles to be picked, to the terminal, where the operator picks articles according to the instructions. Therefore, the operator can accurately pick the articles without special knowledge. In addition, this enables managing the freshness of articles, that it to say, management that an earlier received article is earlier shipped, wherever they arc stored. Besides, inputting article codes and location codes and confirming them at the host computer permits avoidance of a wrong shipment, which leads to an efficient picking operation.

Further, this enables a prompt determination of the quantity of the load burdened on each of the operators handling the terminals in the warehouse, which enables an arrangement of the operators suitable for receiving and shipping a variety of articles. This results in reducing use of papers including slips which have been used in receipt and shipment in the conventional system.

Also, the locations each may have an arbitrary attribute serving to manage warehousing. More specifically, a representative of the attribute is indicative of which shelves are for receipt or for shipment, which corresponds to the operation that the articles positioned therein will experience. For example, if some articles are on a wrong shelf and the location code thereof is scanned to be transmitted to the host computer, the host computer returns some messages denoting refuse of storing the articles in that shelf. In other word, articles are permitted to be stored in the predetermined shelves. Accordingly, accurate and rapid instructions avoids wrong storage as well as wrong shipment.

Figure 7:
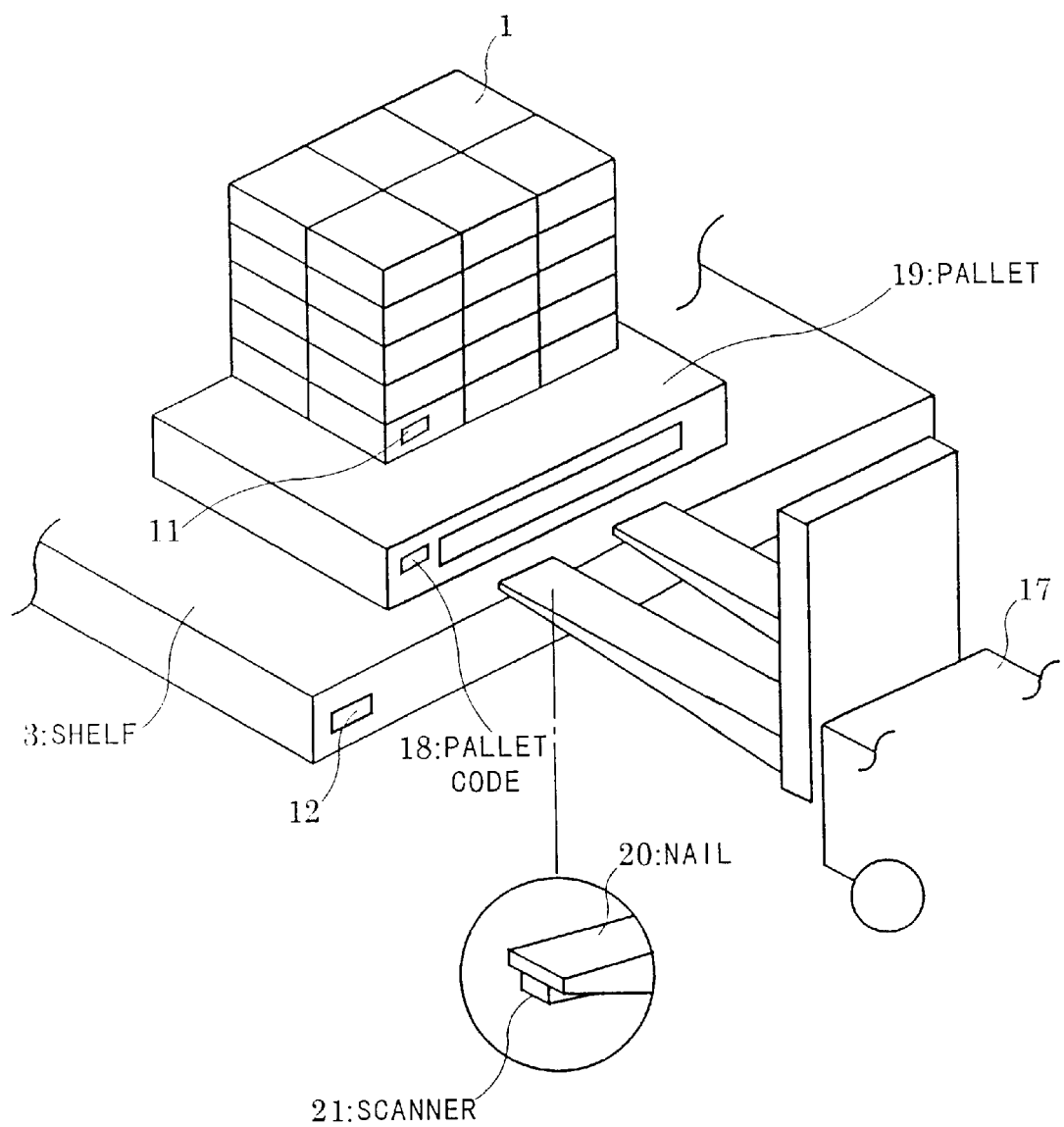
FIG. 7 is a perspective view of the shelf.

FIG. 7 is a perspective view of the shelf which accommodates articles. The articles 1 are stacked on the shelf 3 and are piled up on the pallet 19, which is carried out using a forklift 17. Here, it is assumed that a number of articles constitute one article group in a certain lot. One of the operators scans the article code 11 on the articles 1, the pallet code 18 on the pallet 19, and the location code 12 on the shelf 3 using the terminal, thus transmitting them to the host computer. In a case where all of the articles on the shelf share the same lot number, the same receipt date, and the same manufacturing date, it is possible to manage these articles in total without individually handling. This enables total management of all of the articles laid on the shelf, such as moving or shipping them using the shelf.

Also, as shown in FIG. 7, the scanner 21 may be provided at the top of the nail 20 of the forklift 17. This facilitates reading out the article codes 11, the pallet codes 18, and the location codes 12 in stacking the article 1 on the shelf. In general, reading each article code 11 of all of the articles 1 is difficult. To regard reading out only one article code 11 attached on the lowest article 1, as reading all of the articles codes 11 facilitates inputting information on all of the articles 1.

Even if some of the article codes 11 are behind the respective articles 1, such regarding enables inputting the information on all of the articles 1 in a lump. That is to say, as long as one of the article codes 11 on the articles 1 can be scanned by the scanner 21, the other articles 1 on the same pallets 19 can be handled under control of the host computer.
<Second embodiment>

Figure 8B:
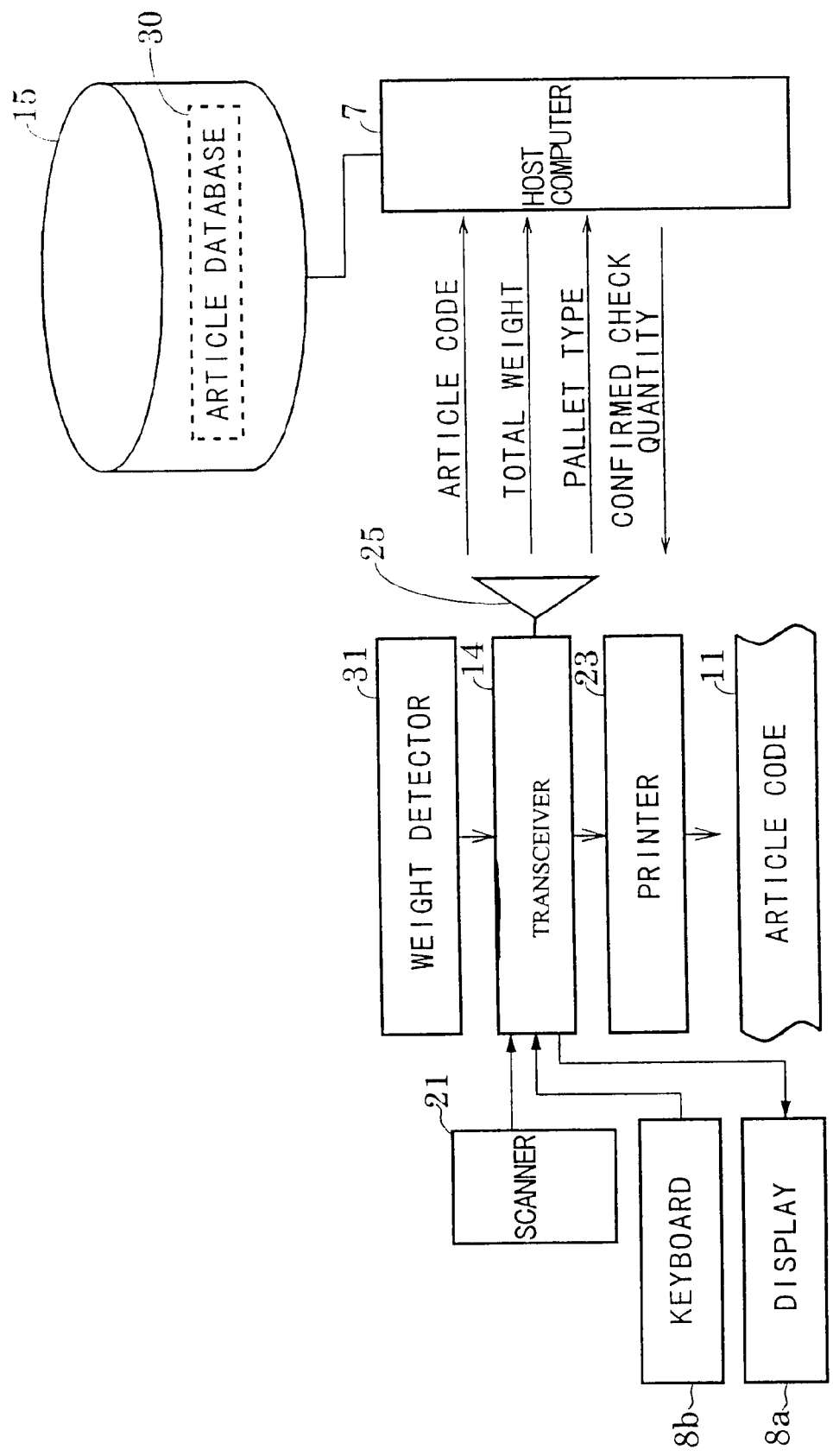
FIGS. 8(a) and (b) show the second embodiment of the warehouse managing system.

Hereinafter, the second embodiment of a warehouse managing system according to the present invention will be now described. FIGS. 8(a) and (b) show the second embodiment of the warehouse managing system. As shown in the diagrams, a plurality of articles 1 are piled up on the pallet 19 in a warehouse. The pallet 19 is conveyed using the forklift 17, wherein the pallet 19 serves for receipt of the articles from a truck into the warehouse and for shipment thereof from the warehouse to the truck or the like. The forklift 17 has the nail 20 which acts to hold the pallet 19.

The forklift 17 is provided with the weight detector 31 at the nail prong 20, which weighs the articles 1 held by the forklift 17. The weight detector 31 outputs a signal denoting the weight of the articles 1 to the terminal 8, wherein the terminal 8 processes the signal. The terminal 8, which is provided on the forklift 17, has a transceiver 14 that is used to communicate with the host computer 7 via the antenna 25. To the transceiver 14 are connected the printer 23, the keyboard 8b, and the display 8a.

At the top of the nail prong 20 of the forklift 17 is laid the scanner 21, the output of which reaches the transceiver 14. The scanner 21 reads out the article code 11 attached to the pallet 19. The article code 11 includes a bar-code label representing an article code widely used in general articles and various information on the article. The printer 23 prints the article code 11. The keyboard 22 is used to notify the host computer 7 of the information on, for example, the type of pallet or container holding the articles 1, via the transceiver 14. The host computer 7 has the article database 30 that stores a variety of information on articles. The article database 30 stores a file indicative of the relation between the article code 11 and the unit weight B thereof, another file indicative of the relation between the pallet type and the weight A thereof, and information S on the number of articles scheduled to be checked at the next receipt or shipment. The database retriever 34 notifies the result of notification to the host computer 7.

Figure 9:
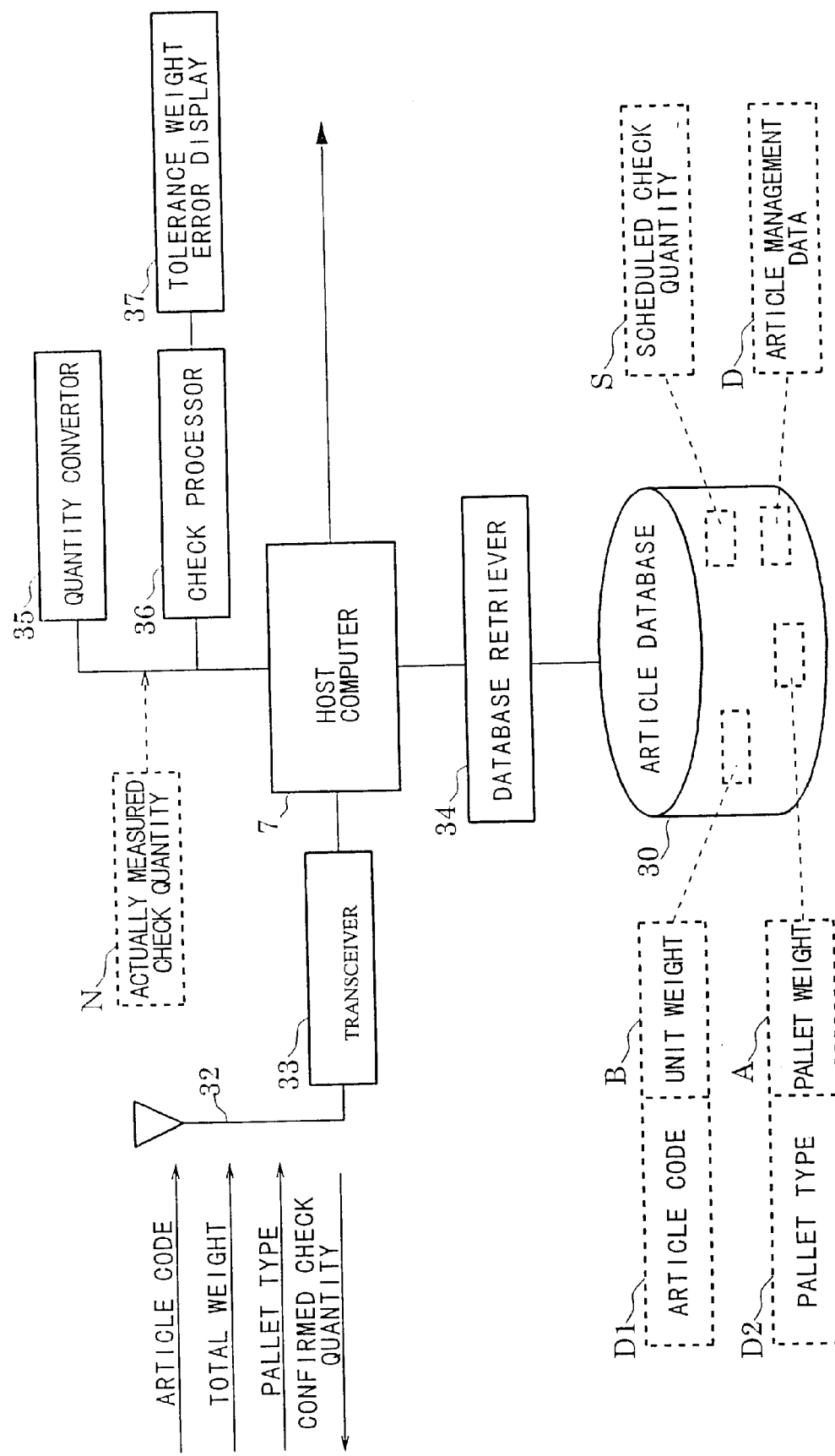
FIG. 9 is a block diagram showing the configuration of the host computer.

FIG. 9 is a block diagram showing the configuration of the host computer, which is coupled to the terminal to allow the transmission of data. Data output from the antenna 25 of the terminal in the forklift (shown in FIG. 8(b)) is input to the host computer 7 via the antenna 32 and the transceiver 33. To the host computer are connected the quantity convertor 35, the check processor 36, and the database retriever 34. The database retriever 34 acts to retrieve the article database 30.

The quantity convertor 35 gives an actually measured number of the articles N, as will be described later. The check processor 36 compares the scheduled check number S and the actually measured check number N, thereby judging the coincidence thereof. The tolerance weight error display 37 indicates the tolerance of errors in calculating, and more specifically, shows the tolerance in a form of weight in total by article, which is available for the process executed by the check processor 36.

Figure 10:
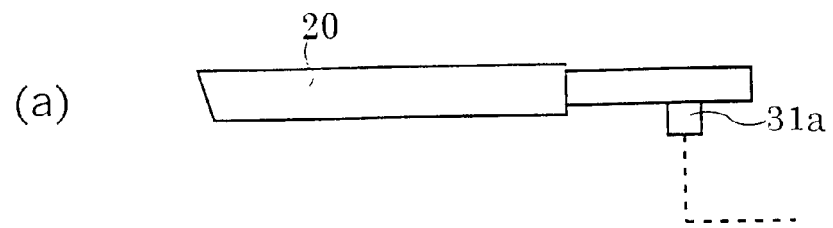
FIGS. 10(a)–(d) are explanatory diagrams showing the configuration of each component in the warehouse managing system.
Figure 10:
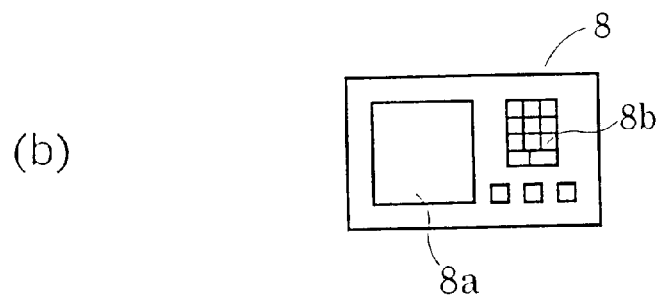
Figure 10:
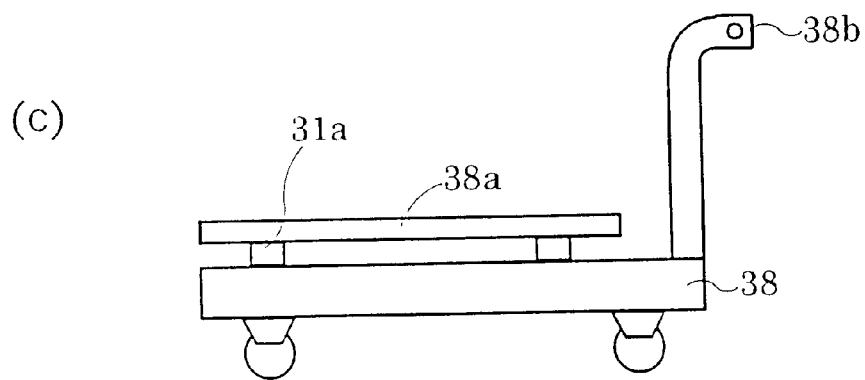
Figure 10:
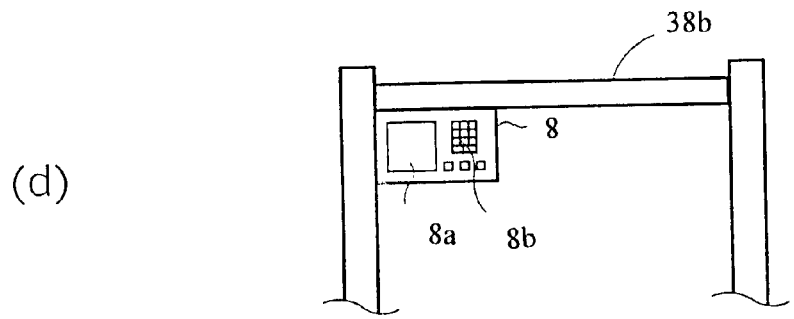

FIGS. 10(a)–(d) are explanatory diagrams showing the configuration of each component in the warehouse managing system. FIG. 10(a) shows the nail 20 in the forklift for sensing the weight of the articles. At the bottom of the nail 20 is fixed the load cell 31a, which upon given a pressure by pallets or articles on nail 20 of the forklift, outputs a signal in proportion with the pressure. The signal reaches the transceiver 14 via the weight detector 31. In this way, the host computer 7 obtains the total weight of the pallet 19 and the articles 1.

FIG. 10(b) shows an appearance of the terminal 8. The terminal 8 is installed on the operation desk or the like of the forklift. The terminal 8 is provided with the display 8a and the keyboard 8b, which are used to input necessary commands and display results.

FIG. 10(c) shows a cart of an improved embodiment, wherein the cart acts in lieu of the forklift. In the above embodiment, the nail of the forklift serves to raise the articles with the pallet, and detects the weight of the articles during conveyance thereof. This reduces time for counting up the number of the articles. Similarly, using the cart 38 can provides the same effect. On the cart 38, for example, is positioned the table 38a, under which the load cell 31a is provided. The enables weighing the stacked articles similarly to the nail of the forklift. The operator utilizes the cart 38 by pushing the handle 38b when receiving and shipping the articles.

FIG. 10(d) shows a side view of the cart of FIG. 10(c). Under the handle 38b is hung the terminal 8. In this case, the operator inputs some commands using the keyboard 8b, and obtains necessary information on the display 8a. In both cases of the forklift and the cart, information on container type or pallet type is fed using the keyboard 8b, while the final confirmed check quantity is shown in the terminal 8.

Returning to FIG. 10(b), the terminal 8 outputs to the host computer 7 the article code read out with the scanner 21, the total weight W of the articles 1 and the pallet 19 detected with the weight detector 31, and the pallet type input by the operator. Based on this information, the host computer 7 returns the confirmed check quantity, which is indicated in the display 8a.

Figure 11:
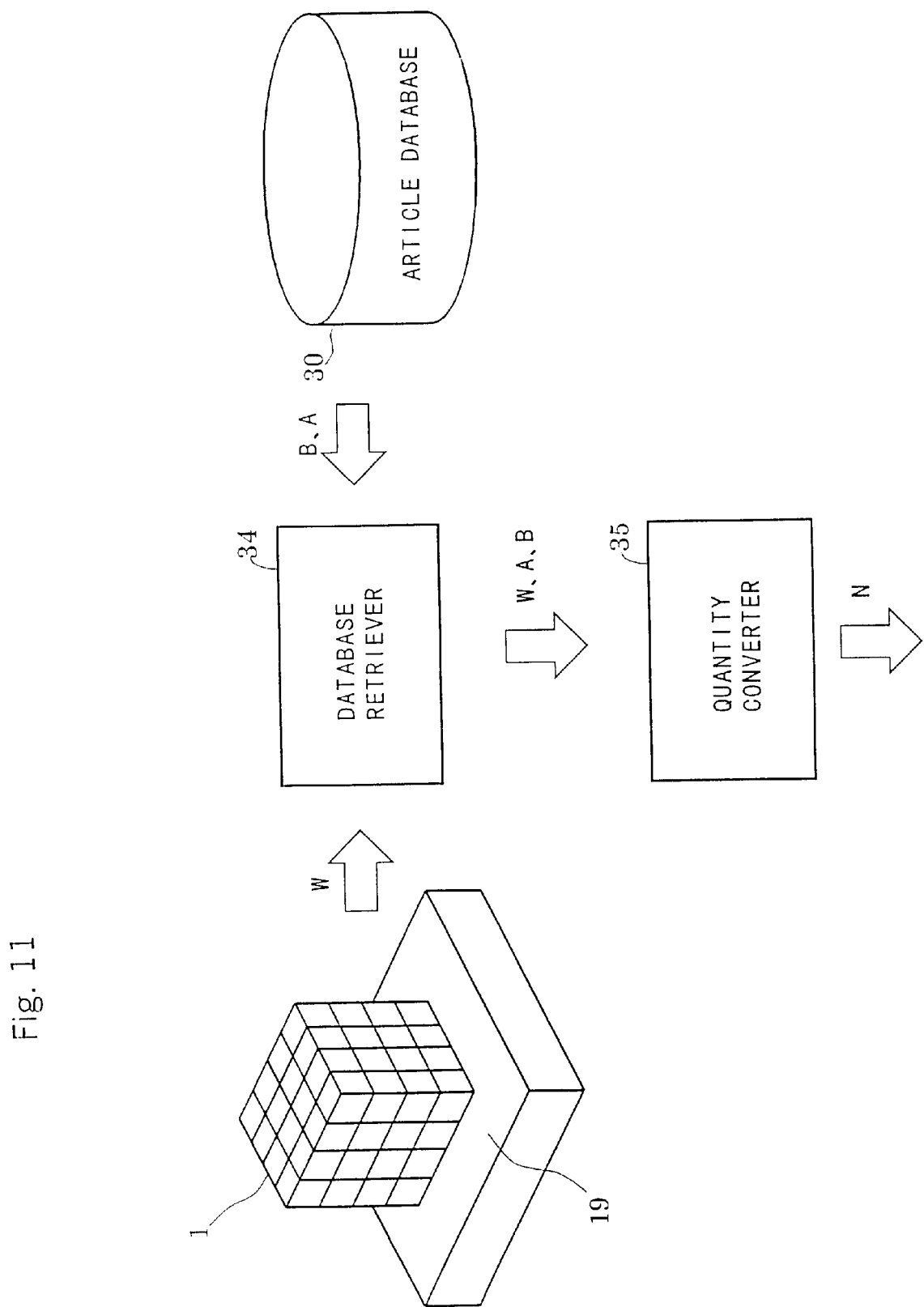
FIG. 11 is an explanatory diagram showing an arithmetic operation.

FIG. 11 is an explanatory diagram showing an arithmetic operation. The host computer 7 obtains the actually measured check quantity N using the expression: $N=(W-A)/B$, where W denotes the total weight, A denotes the pallet weight, and B denotes the unit weight. This calculation is directly carried out by the quantity convertor 35.

First, the total weight including the weight of the articles, pallet, and a variety of containers are notified to the host computer 7 as well as the article code 11. Next, the database retriever 34 retrieves the article database 30 based upon the article code 11 to obtain the unit weight B of the articles. The terminal notifies the host computer 7 of the pallet type. The database retriever 34 obtains the weight of the pallet from the article database 30 on the basis of the pallet type. Finally, the quantity convertor 35 obtains the actually measured check quantity N through calculation of the above expression.

In summary, the host computer 7 holds data on the unit weight of the articles and the weight of the pallet, and calculates the total number of the articles based upon the total weight actually weighed by the forklift. This can give an accurate check quantity of the articles.

On the other hand, the quantity of the articles scheduled to be shipped or received have been apparent in advance at the stage of article management. This data is involved in the article database 30. The check processor 36 compares the scheduled check quantity S and the actually checked quantity N, thereby judging whether or not they are coincident with each other. In case of detecting the weight of the articles, the weight corresponding to the scheduled check quantity is not always the same as the actually measured total weight, in terms of weight accuracy.

In light of tolerance of the weight of the articles and the weight of the pallet, however, a margin of weight error becomes apparent, being stored in the tolerance weight error display 37, which gives a confirmed check quantity by quantity conversion therewithin. For example, rounding up or down gives the actually measured check quantity N, which provides the confirmed check quantity if the measured check quantity N coincides with the scheduled check quantity S.

Figure 12:
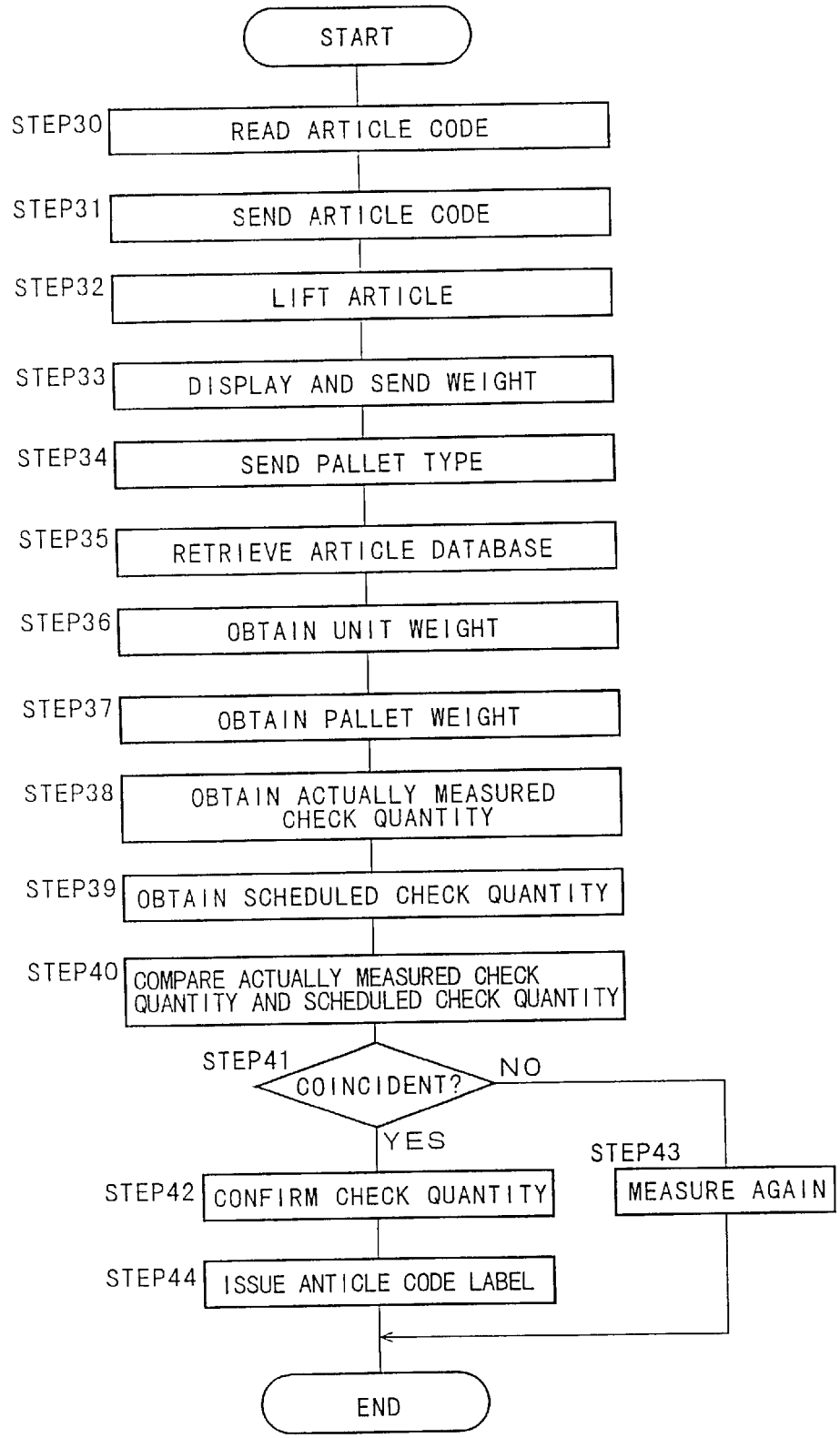
FIG. 12 is a flowchart showing the operation of the warehouse managing system of the second embodiment.

FIG. 12 is a flowchart showing the operation of the warehouse managing system, in which the steps 30–34 and 44 show the operation of the terminal while steps 35 43 show the operation of the host computer. At the step 30, the scanner 21 fixed on the top of the pallet 19 of the forklift 17 reads the article code 11 on the pallet 19. At the step 31, the host computer is given the article code. At the step 32, the articles 1 and the pallet 19 arc lifted using the forklift 17. In this way, the weight is detected. At the step 33, the display of the terminal 8 shows the weight and notifies the weight to the host computer. The operator operates the terminal 8 and inputs, in step 34, the pallet type using the keyboard, which is sent to the host computer.

At the step 35, the host computer retrieves the article database 30, and obtains a unit weight of the articles based upon the article code, at the step 36. At the step 37, the weight of the pallet is obtained on the basis of the pallet type. At the step 38, the quantity convertor 35 converts the quantity of the articles to obtain the actually measured checked quantity N. The host computer 7 retrieves the article database 30 to obtain the scheduled checked quantity S, at the step 39. At the step 40, the actually measured checked quantity and the scheduled checked quantity are compared. The tolerance undergoes a quantity conversion, whereby the coincidence is judged as described above. If coincident, the checked quantity is confirmed at the step 42 whereas the terminal is requested to measure the weight again if not coincident, at the step 43. At the step 44, the confirmed checked quantity is received by the terminal, and the printer 23 is activated to issue the article code label 11a.

The article code label 11a includes the confirmed check quantity, the article code, the article quantity, and the issue date printed on a bar-code, which is attached on a suitable place of the pallet 19. Checking which of the operations follows the attachment of the article code label 11a is carried out through reading these data. The printer, if installed in the terminal, issues the article code label likewise.

As described above, in the warehouse managing system of the second embodiment, when the received or shipped articles are lifted or raised by the forklift or the cart, the total weight is obtained to instantly check the quantity of the articles. This utilizes the correct unit weight of the articles and the correct weight of the pallet, which reduces errors in calculation, that is to say, gives an accurate value. In a case where an error found in comparing it with the scheduled checked quantity is large, measurement is carried out again. If the result of remeasuring appears to be wrong, the judgment that wrong number of articles are stacked is made. This enables accurate management of receiving and shipping as well as reducing the job of the operators. Besides, the article code labels are issued and are attached on the articles and pallets or the containers in these processes, which facilitates the following article management.

In the embodiment, the weight detector needs to be laid in the warehouse; however, units or components other than the weight detector are not always laid in the warehouse. Therefore, the data in the article database, such as unit weight of the articles and the weight of the pallet, may have been stored in the terminal 8 in advance. Further, the terminal 8 may implement processes such as quantity conversion and confirmation of check quantity in place of the host computer, which is accomplished through transmission of necessary data from the host computer in advance. This can remove counting up by operators of the articles individually referring to slips, which reduces the amount of paper and gives real-time management of warehousing. For communication among the host computer and the other equipment in the embodiment, for example, light communication, infrared communication, and metalcable communication are available for the warehouse managing system, in lieu of the radio communication. Moreover, in place of comparing in terms of weight, comparing in terms of quantity is available for identifying the actually measured checked quantity and the scheduled checked quantity.

Figure 13:
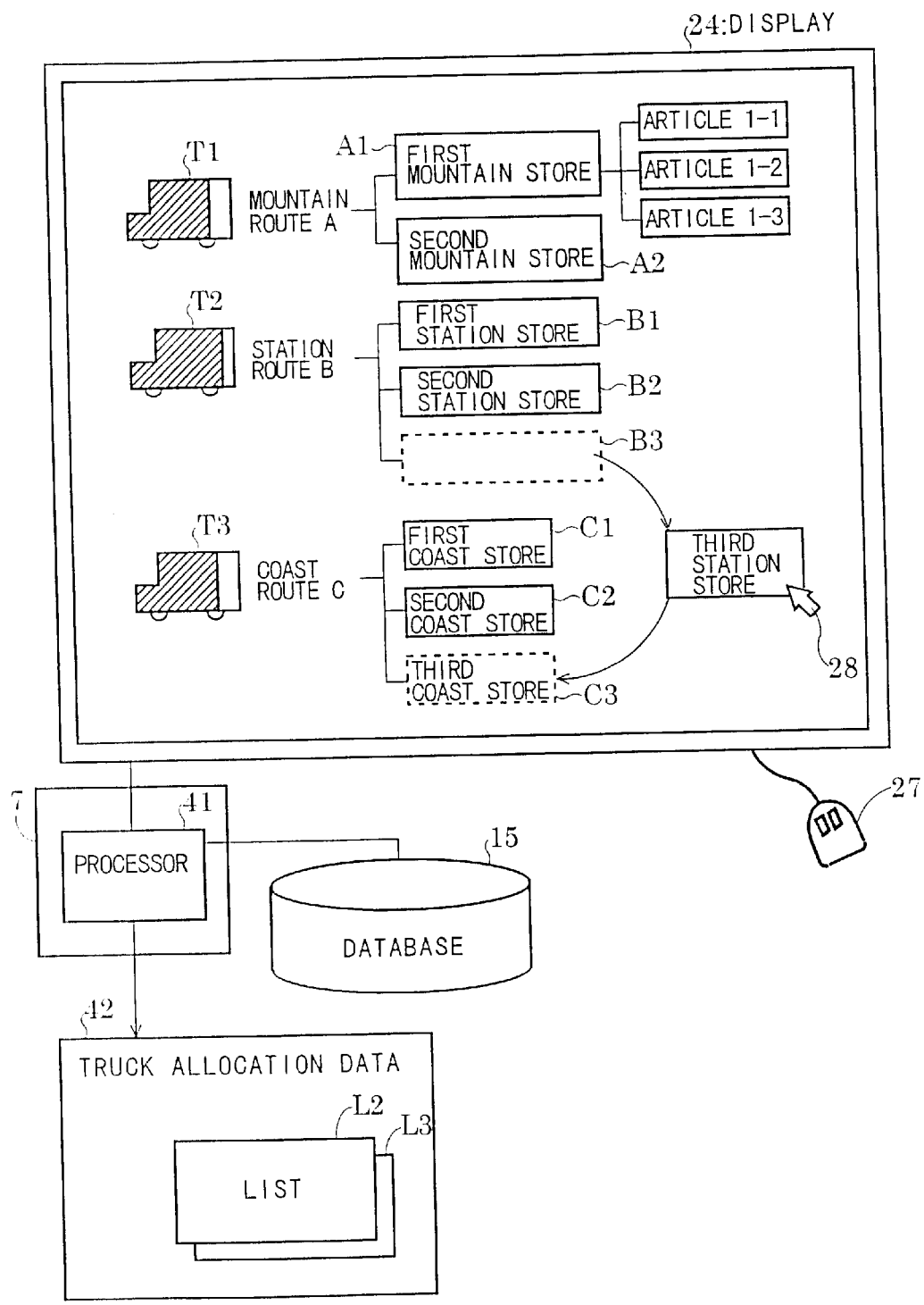
FIG. 13 is an explanatory diagram showing allocation of trucks according to the third embodiment.

Hereinafter, the third embodiment of the warehouse managing system according to the present invention will be now described. FIG. 13 is an explanatory diagram showing an allocation of trucks according to the third embodiment. Prior to explaining the third embodiment, the operation of allocating trucks will be schematically described.

Figure 14:
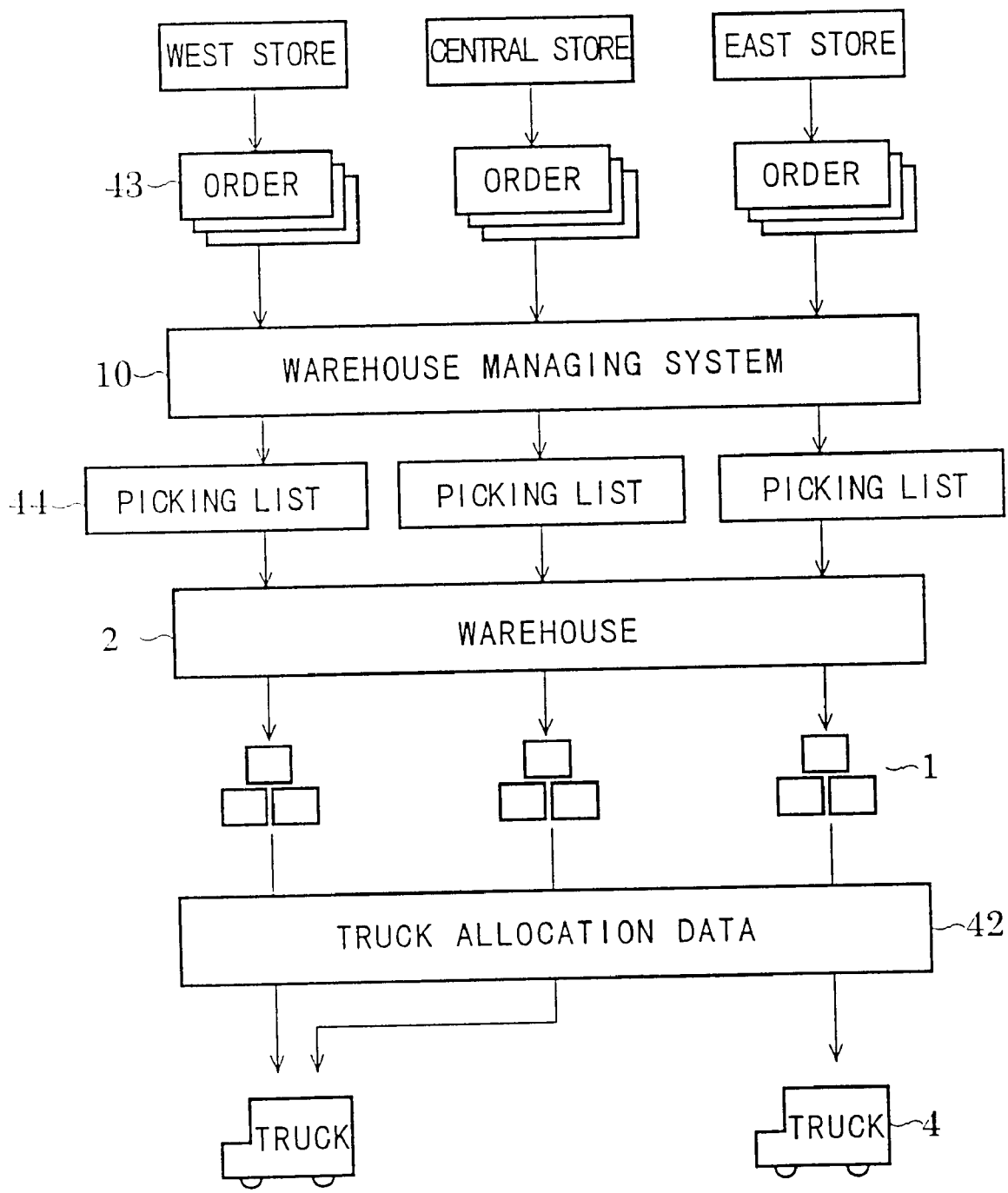
FIG. 14 shows the procedure of ordering articles and allocating trucks.

FIG. 14 shows the procedure of ordering articles and allocating trucks in case of receipt of article orders from a plurality of customers. As shown in the figure, it is assumed that the customers such as the west store, the central store, and the east store, make the respective orders 43 to the warehouse managing system 10. After inputting the orders 43, the warehouse managing system 10 prepares the picking list 44 based thereupon. Herein, the picking list 44 is a slip on which the article name, the quantity thereof, and the destination thereof are printed, which may indicate the places storing those articles and the order of withdrawing the articles. Pursuant to the picking list 44, an operator in the warehouse 2 picks up articles and conveys them for shipment. The articles are loaded on the trucks 4 with reference to the truck allocation management data, which shows article names, truck numbers, destinations or routes thereof, or the like. In summary, allocating truck is defined as the operation of assigning the articles to the trucks, and preparing for the truck allocation management data if necessary.

Figure 15:
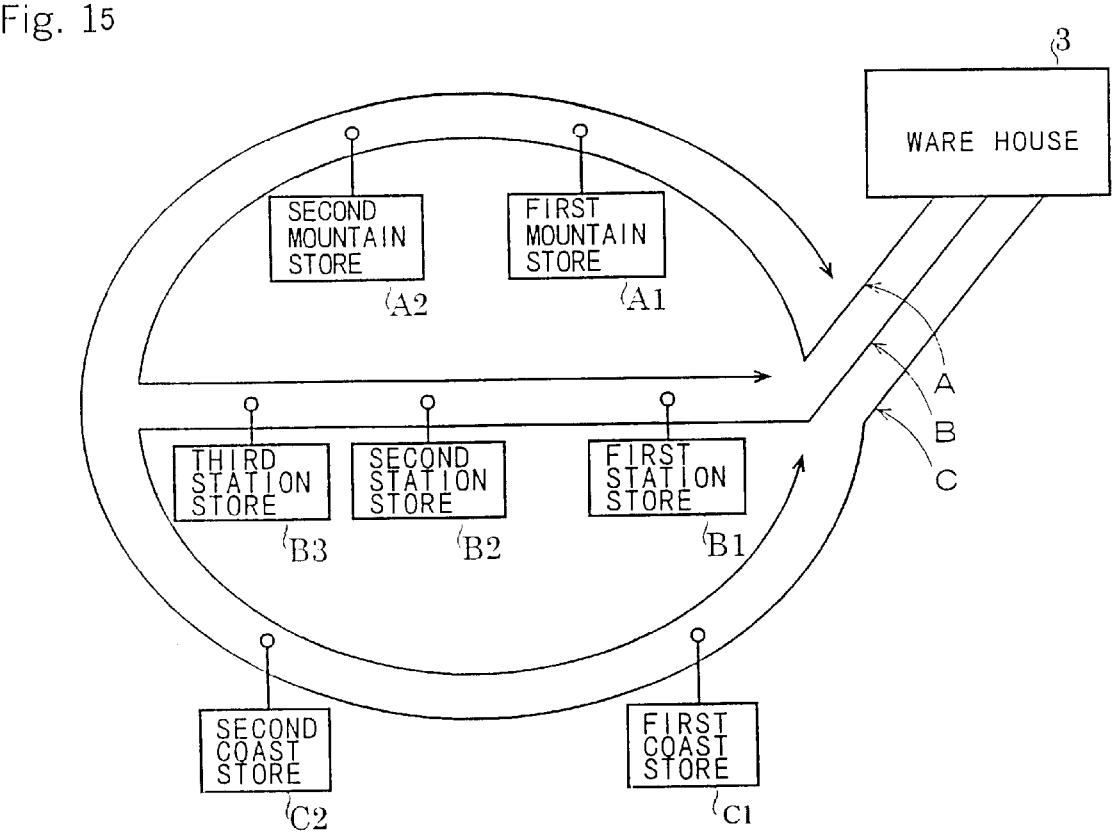
FIG. 15 is an explanatory diagram showing the routes of the trucks.

FIG. 15 is an explanatory diagram showing routes of the trucks. The trucks 4 depart from the warehouse 2, to go round the respective customers along the predetermined routes, such as the mountain route, the station route, and the coast route, thus gathering and delivering the articles. Along the mountain route A are disposed the first mountain store A 1, and the second mountain store A2; along the station routes B are disposed the first station store B1, the second station store B2, and the third station store B3; and along the coast route C are disposed the first coast store C1 and the second coast store C2. In each of the routes, the out-going way and the in-coming way differ from each other. For example, for the mountain route, along the out-going way the truck passes the mountain stores A1 and A2, while along the in-coming way the it passes the station stores B3, B2, and B1. This overlap of ways enables the trucks to adjust the respective articles to be delivered.

For example, if the mountain route A has a few articles to deliver, and the station route B has many articles, the truck for the former route A is loaded with the articles for the third station store B1 as well as the articles for the first mountain store A1 and the second mountain A2, whereas the truck for the latter route B is loaded with the articles for the first station store B1 and the second station store B2 only. Allocating trucks is also defined as the operation of assigning the articles and the customers through adjustment by trial and error. The present invention features that such an operation is readily carried out using a computer system.

Referring to FIG. 13, the operation of the third embodiment of the warehouse managing system will be described, hereinbelow. The display 24 indicates the result of executing an arithmetic operation by the processor in the computer. In the storage unit 15 are stored a variety of data, such as the contents of the orders, the contents of the picking lists, and the information on the truck allocation. The display 24 illustrates the routes, the stores positioned along the routes, and the articles ordered by the stores, all of which correspond to each other like a tree. Here, it is assumed that one truck is assigned to one route as following: the truck T1 to the mountain route A, the truck T2 to the mountain route B, and the truck T3 to the coast route C.

As shown in the figure, the truck T1 is scheduled to deliver the article for the first mountain store A1 and the second mountain store A2. In the display 24 are shown the loadage of the truck T1 that is loaded with all of those articles, and the ratio thereof to its capacity. Displaying the loadage using numerals may be available for the display, likewise. These displays enable the operator to promptly grasp the allocated trucks, the loadage and the state thereof as well as the stores and the articles.

Besides, the operator can determine whether the total weight of the articles assigned to a truck is beyond the loadage thereof or not. Again, the operator can allocate the trucks, and more definitely, assign articles of a truck to another truck because having obtained the routes of the trucks as described above. The re-allocation is carried out using the mouse (pointing device) 27 or, the pointer 28 as follows: placing the mouse 27 on the symbol of a store in a route, moving the symbol with the mouse 27 pressed, and releasing the mouse 27 in another route. This operation is similar to dragging widely used in operating application programs of common personal computers. The diagram depicts transference of the third station store, that is, the article therefor from the station route B to the coast route C.

The processor 41 monitors the positions of the symbols depicted on the display 24, and if the transference arises, detects the origination and the destination thereof. Based upon the originally assigned stores or articles and the transferred store or articles, the processor 41 calculates the total weight thereof for the coast route C. Similarly, the processor 41 calculates the total weight of the articles for the station route B after the transference.

Figure 16:
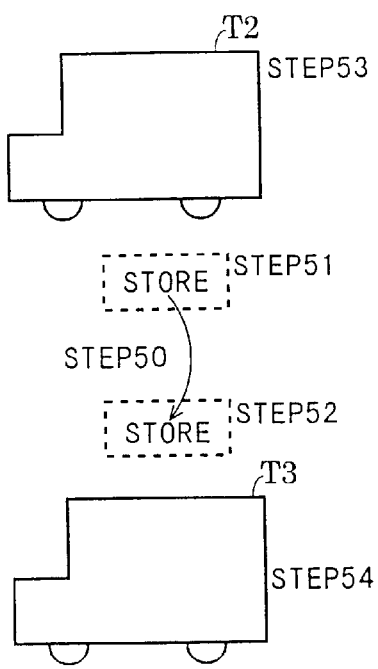
FIG. 16 is an explanatory diagram showing the calculation method.

FIG. 16 is an explanatory diagram showing the calculation method. First, at the step 50, a symbol, that is, a store or the articles therein, laid along the route that the truck T2 takes is moved to be laid along the route that the truck T3 takes, through dragging. Next, at the step 51, the position of the symbol before transference is detected while the position of the symbol after transference is also detected, at the step 52. At the step 53, a subtraction operation on the loadage of the truck T2 and an addition operation of the loadage of the truck T3 are carried out at the step 54, thus being shown in the display.

The processor 41 executes such operations to indicate the results thereof in the display 24. Further, the results are printed as the truck allocation data 42, which serves as instructions for the operators who loads the articles 1 on the trucks 4. As shown in FIG. 13, the instructions include the loading list L2 for the truck T2, and the loading list L3 for the truck T3.

FIGS. 17(a)–(c) are explanatory diagrams showing a variety of data used for the third embodiment. As shown in FIG. 17(a), an order for articles is sent from one of the customers, which prepares article base data. The article base data contains article codes, customer names, and quantity, unit weight, and volume of articles, which correspond to each other, for example. The weight of articles and the volume thereof are necessary to estimate the total weight of the articles to be loaded and the total quantity thereof.

FIG. 17(b) shows the truck base data. The truck base data contains truck names, driver names, maximum loadage and volume, which correspond to each other. The data is indicative of information on each truck, which makes it possible to estimate the quantity of articles loaded on each truck. With respect to articles, if respective quantity, routes, and customers are given, trucks can be assigned the articles according to respective capacity, which is depicted in the display 24.

As a result of such an operation, the allocation truck management data is prepared, as shown in FIG. 17(c). The allocation truck management data involves truck names, routes, names of articles to be loaded, customer names, and loadage. Preferably, it contains the loading order of the articles into the trucks. Pursuant to the truck allocation management data, the operator can load the articles 1 on each of the trucks in such a fashion that the truck, the route, the articles, the customer, and the quantity meets the instructions in the truck allocation management data. This removes the job of inputting data in re-allocating trucks from operators, enables a variety of simulation, and gives preferable results of truck allocation.

In the above embodiment, each symbol represents a store, or all of the articles therefor. However, it is preferable that each symbol represents each of the articles, because even if a store orders a large number of articles that exceed the capacity of each truck, those articles can be allotted to a plurality of trucks by article, whereby the trucks can cooperatively deliver the articles to the same customers.

In lieu of the mouse for use in dragging over the display 24, other pointing devices such as a digitizer freely driving the pointer 28 or the like are available. Also, for example, a pressure sensing transparent panel, which acts in response to pressure given in the display by finger can be used.

Moreover, the above embodiment shows the example that the articles ordered by a plurality of customers are delivered thereto. Such a delivering system, however, can be applied to a collecting system, and also to an individual collecting and delivering system.

Articles in the embodiment are not limited to objects to be bought and sold. Similarly, the trucks in the embodiment are representative of vehicles, trains, ships, planes, and the like. It is possible to indicate one of a truck and the route thereof for the purpose of showing the route of the truck. One route may involve more than one truck, in which, for example, one of the trucks is referred to as the truck for the first mountain route, and another is referred to as the truck for the second mountain route, thus permitting a plurality of routes to be shown.

Concerning customers, the symbol may represent one store or a plurality of stores in the lump. That is to say, it is possible to simultaneously transfer a plurality of stores. Further, the above operation can be carried out through executing an application program with a variety of symbols displayed over the display, wherein the program can be given to the system with a floppy disk or the like.

As described hereinbefore, in the truck allocation system of the third embodiment, the symbols of the routes and the customers for articles, which correspond to each other, are indicated in the display. Moving the symbols give some simulation of re-allocating trucks delivering the articles, which facilitates truck allocation and makes the operation fast and accurate. Furthermore, synthetical article management using systems for order receipt and picking can provide an easily-operational system which is capable of reducing input operation of new data.

<Forth Embodiment>

Figure 18:
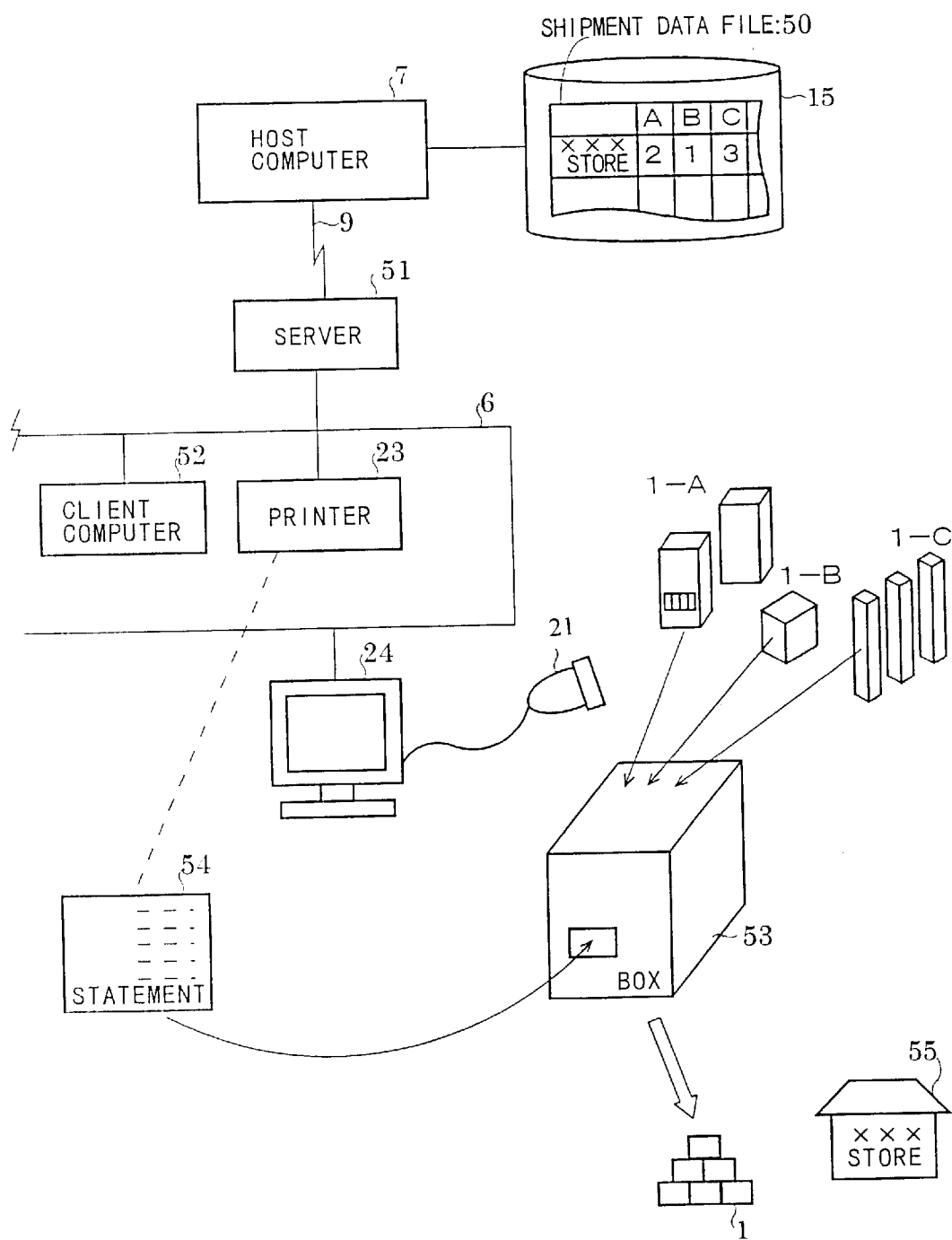
FIG. 18 is a schematic diagram showing the warehouse managing system of the fourth embodiment.
Figure 19:
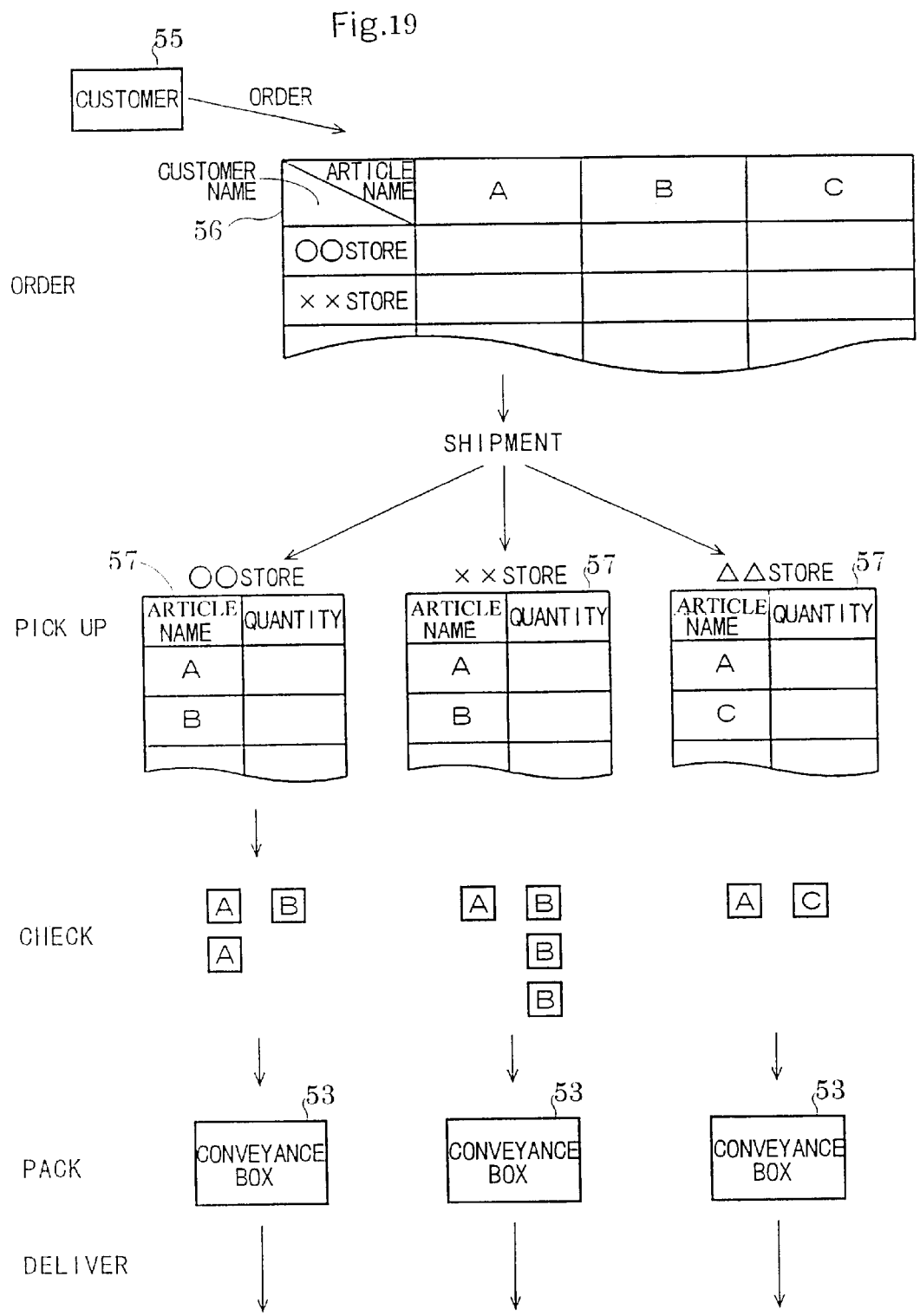
FIG. 19 is a schematic diagram showing a common warehouse managing system.

Hereinafter, the forth embodiment of warehouse managing system will be now described. FIG. 18 is a schematic diagram showing the warehouse managing system of the fourth embodiment. Prior to explanation of the fourth embodiment, a common warehouse managing system will be described. FIG. 19 is a schematic diagram showing a common warehouse managing system. Upon receipt of article orders from stores or customer 55, the lists denoting the articles to be shipped from the warehouse are prepared pursuant to the articles orders, as the shipment data 56. The shipment data 56 includes customer names and article names, being indicative of type or quantity of the articles by customer. Using the shipment data 56, the pick-up lists 57 are prepared, in which the articles and quantity thereof correspond to each other by customer. Looking at the list 57, an operator in the warehouse withdraws the necessary articles laid therein to pack them in conveyance boxes 53. At this time, the articles packed in the conveyance boxes 53 are compared referring to the pick-up list 57.

In this way, the conveyance boxes 53 are delivered to the respective customers. Such a system, in general, automates warehouse management such as picking operation and checking operation, using some computer operations as described later. The present invention features facilitating the receipt operation in a customer store which has received a plurality of conveyance boxes.

Returning to FIG. 18, the warehouse managing system is controlled by the host computer 7. The warehouse managing system is connected to the server 51 laid in the warehouse via the communication line 9, wherein the server 51 manages the articles in the warehouse. The sever 51 is connected to check terminal 8, the printer 23 and the client computer 52 via the network 6 such as LAN (Local Area Network).

The check terminal 8 reads the bar-codes attached on the articles using the scanner 21 to notify information on the articles such as article type to the server 51, which is transferred to the host computer 7 so as to be compared with the shipment data file 50. The printer 23 prints a variety of slips, as will be described later. The client computer 52 serves to input various data for warehouse management.

The shipment data file 50 is stored in the storage unit 15 provided in the host computer 7. The shipment data file 50 includes the shipment data 56. After operation of the check terminal 8, and reading of the bar-codes attached on the articles 1-A, 1-B, and 1-C to be shipped using the scanner 21, information on type, quantity, and destination of the articles to be shipped, are notified to the host computer 7 for checking them. The articles 1-A, 1-B, and 1-C are packed into conveyance boxes 53 according to the destination. The conveyance boxes are loaded on trucks to be delivered to the respective destinations.

According to the invention, in a case where the check terminal 8 reads the bar-codes of the articles 1-A, 1-B, and 1-C to store them into the conveyance boxes 53, the results of checking the conveyance boxes 53 are added up by conveyance box. Thereafter, the added resultant is printed by the printer 23 This is referred to as the conveyance box contents statement 54. That is to say, in a case where there are a plurality of conveyance boxes to be delivered to the same customer, the conveyance boxes 53 are issued the respective conveyance box contents statements 54. Each of the conveyance boxes 53 and the corresponding conveyance box contents statement 54 are delivered to the store 55 together.

Figure 20:
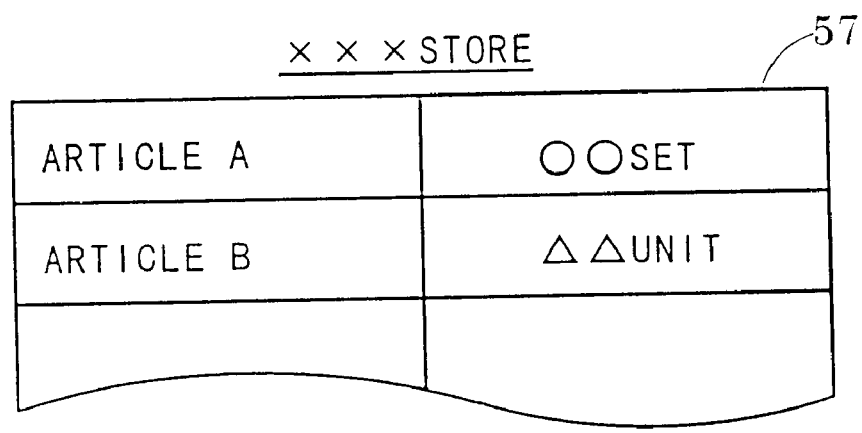
FIGS. 20(a) and (b) are explanatory diagrams showing the article list and the conveyance box contents statements.
Figure 20:
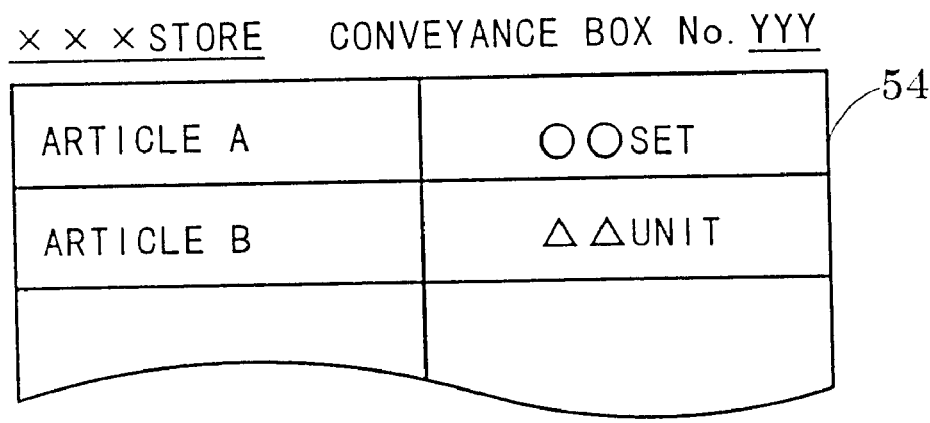

FIGS. 20(a) and (b) are explanatory diagrams showing the article list and the conveyance box contents statement for each store. FIG. 20(a) shows the pick-up list 57 that arranges all of the articles and the quantities thereof according to store. In accordance with this invention, as shown in FIG. 20(b), to the conveyance boxes 53 to be delivered to the same customer are respectively attached the conveyance box contents statements 54 each showing the name and the quantity of the articles contained in each conveyance box 53.

Subsequently, in the store 55, upon receipt of the conveyance boxes 53, checking the contents of one of the conveyance boxes 53 is performed through referring to the conveyance box contents statement 54 that corresponds to the conveyance box 53 and is laid therein, which is attained only by opening the conveyance box 53 itself. That is to say, the name and quantity of the articles in one conveyance box 53 is checked without opening the other conveyance box. After checking at receipt of the articles, the articles can be arranged on the article shelves of the store by conveyance box. In addition, since determining the procedure of arranging the articles, such as the order of opening the conveyance boxes, is carried out through comparing all of the conveyance box contents statements, opening a conveyance box and arranging articles can be performed according to necessity or demand, which results in fast checking and receiving operations. This reduces jobs of the clerk working in the store 55, thus leading to efficient receipt of articles.

In a conventional case, since only the list shown in FIG. 20(a) has been delivered to its destination, a clerk in the store must open all of the conveyance boxes to check the name and the quantity of the articles laid therein. In contrast to this, according to the present invention, it is possible to readily check the articles by conveyance box with reference to the conveyance box contents statement corresponding to the conveyance box containing the articles, which can decrease jobs of clerks.

<Fifth Embodiment>

Figure 21:
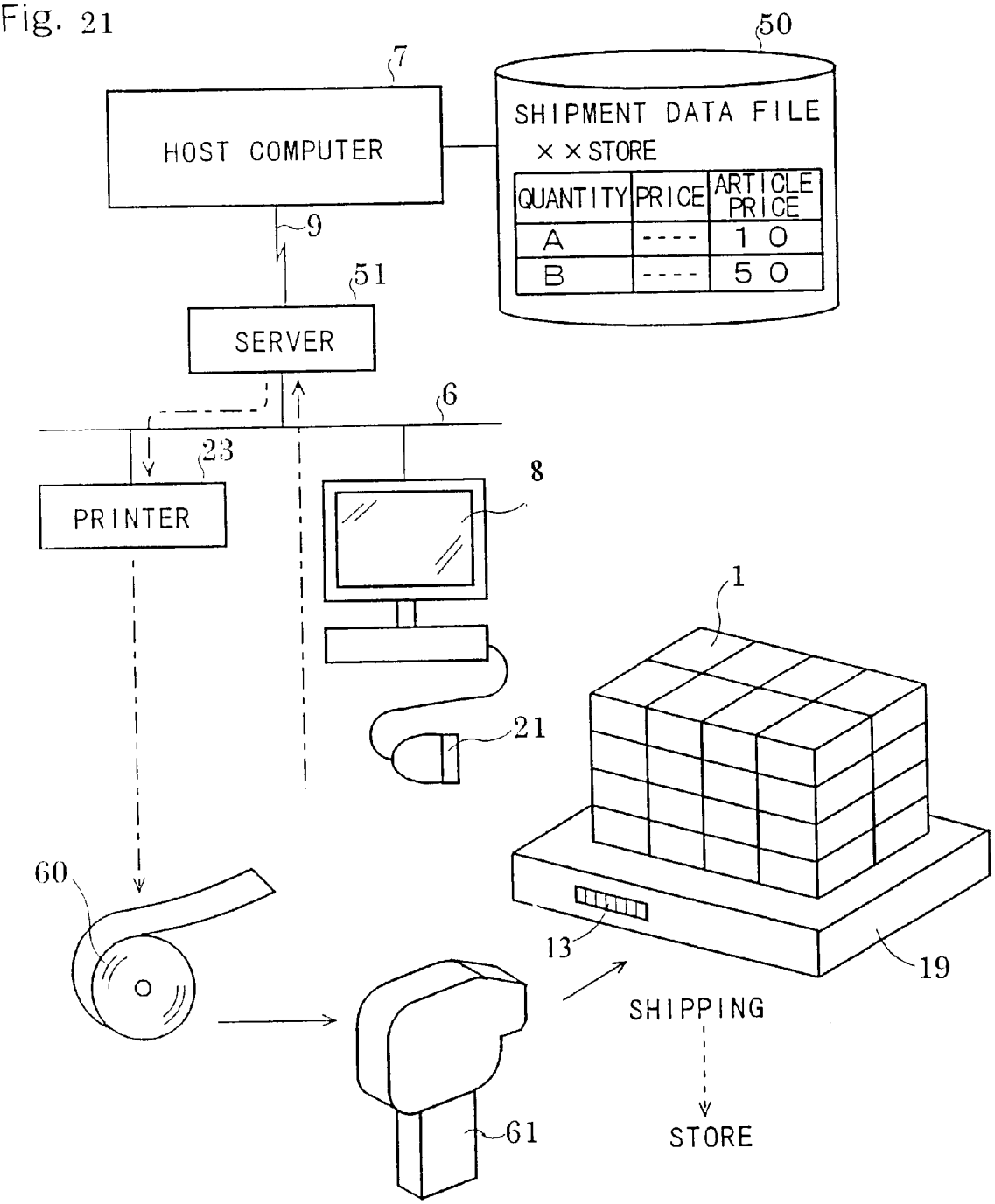
FIG. 21 is a schematic diagram showing the fifth embodiment of the price tag processing system.

Hereinafter, the fifth embodiment of the price tag processing system will be now described. FIG. 21 is a schematic diagram showing the fifth embodiment according to this invention. In the system, the host computer 7 is connected to the server 51 via the network 6 to control checking of articles. On the side of host computer 7 is stored the shipment data file 50 for article management. On the side of the server 51 are connected the check terminal 8 and the printer 23 via the LAN (Local Area Network) to execute check process. The server 51 is positioned in an area for warehousing.

The operator in the warehouse picks up the articles 1 according to the instructions at shipment, which is carried out with reference to the shipment slip. Thereafter, the articles are stacked on the pallets 19, which are attached thereon the respective bar-codes 13 indicative of the types, the quantities, or the like of the articles on the pallets 19, wherein each bar-code may be put on each article directly.

The check terminal 8 checks whether or not the picked articles meets the shipment data file 50. The scanner 21 of the check terminal 8 reads the bar-code 13 to obtain the information on the articles, thus transmitting them to the host computer 7. The printer 23 issues price tags or label 60 showing the prices of the articles. The labels 60 are put on the articles 1 using the labeler 61 after checking.

Figure 22:
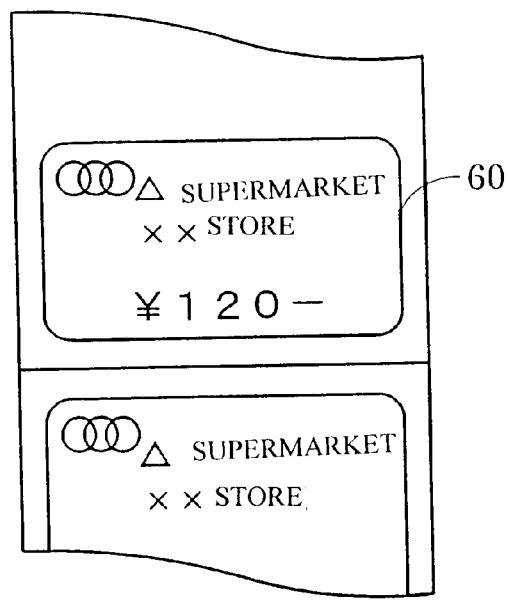
FIGS. 22(a) and (b) are explanatory diagrams showing the price tags.

FIGS. 22(a) and (b) are explanatory diagrams showing the price tags, wherein FIG. 22(a) depicts the contents of the shipment data file 50 in a store, which includes information on the types, quantities, and prices of the articles, for example. Once the articles are identified through scanning by the scanner 21, the article information is sent to the host computer. The host computer refers to the shipment data file 50 to transmit information on the prices and the quantities of the articles to the check terminal and the printer via the server.

The check terminal confirms the types and the quantities of the picked articles. As shown in FIG. 22(b), the printer issues the labels 60 which are printed the prices of the articles as well as the store names and the trademarks of the stores. It may include article names together. Upon receipt of information on the quantities of the articles, the printer issues the tags the number of which corresponds to that of the articles. The labels 60 are set in the labeler 61 shown in FIG. 21, thus being attached on each article for delivery.

Figure 23:
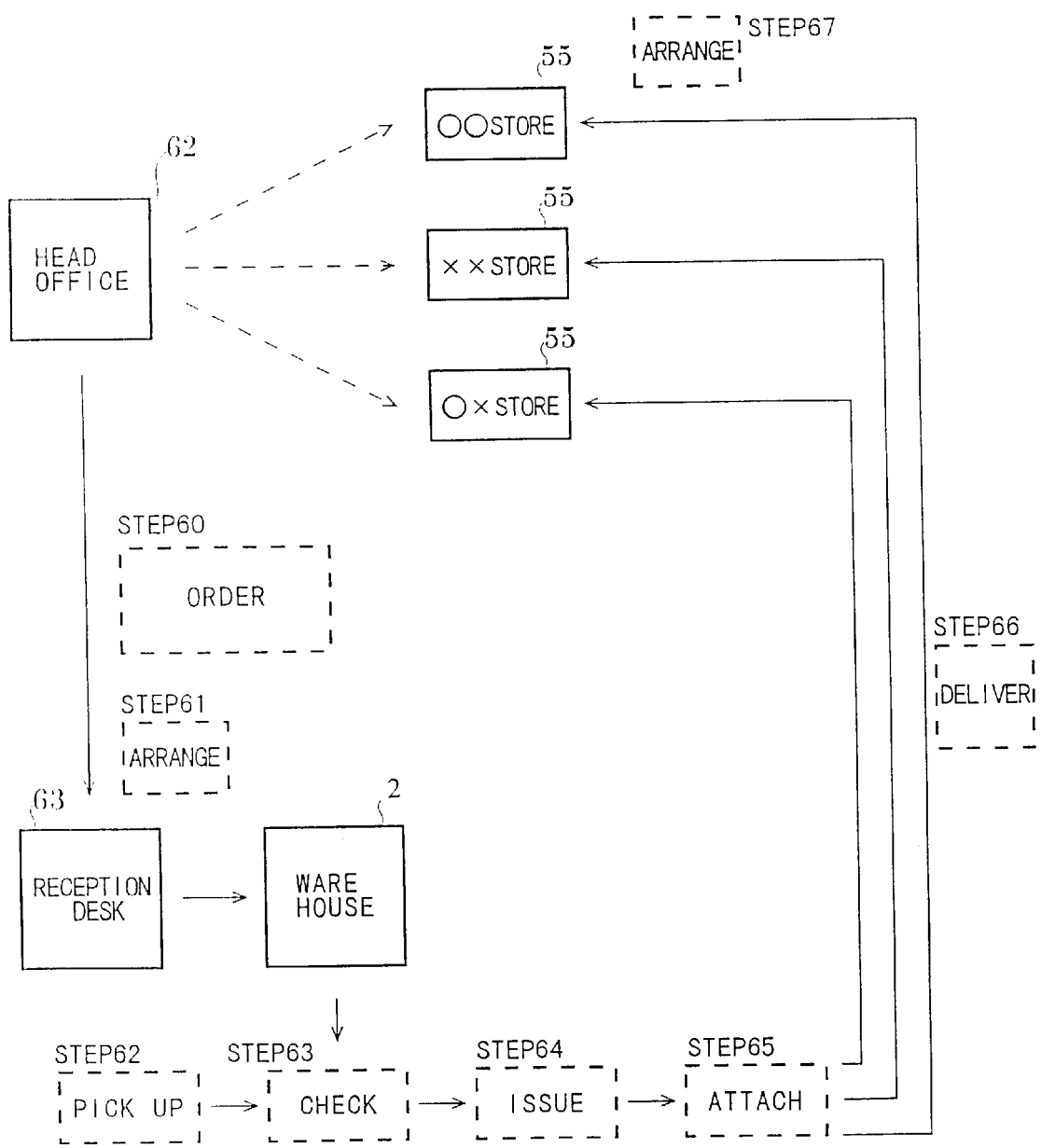
FIG. 23 is an explanatory diagram showing the flow of the tag processing system.

FIG. 23 is an explanatory diagram showing the flow of the tag processing system. At the step 60, the head office 62 of a supermarket makes an article order. Next, article information and article price information are notified to the reception desk 63, at the step 61. In accordance with the invention, in case where the prices of the articles are apparent prior to delivering of the articles, the articles are planed to be delivered with the price tags attached thereon. Therefore, it is not always necessary that all of the article prices have been apparent at ordering. That is to say, it may be possible to notify the article prices after article ordering and to issue price tags based upon the notification. The reception desk 63 arranges the articles and starts preparation of delivering in the warehouse. At this time, at the step 62, the articles are picked up according to customer.

As shown in FIG. 21, the articles are checked using the scanner 21 by scanning barcode 13. The scanner 21 correctly notifies the check terminal 8 of the article information on the articles 1 to be checked, whereby the correct article information is transmitted and the corresponding price tags are issued at the same time as completion of checking the articles, at the step 64. Thereafter, the price tags are put on the articles immediately after checking them, at the step 65. Since corresponding to the number of the articles, the prices tags are issued and also are issued by type of article, putting the price tags and checking the quantities of the articles are performed at the same time, which facilitates finding out errors in putting the price tags.

In this way, after completion of putting on the price tags, the articles are packed by store to be delivered thereto, at the step 66. Subsequently, upon delivering of the articles, each store 55 identifies the contents thereof, which enables immediately arranging the articles on the articles shelves in the store.

Figure 24:
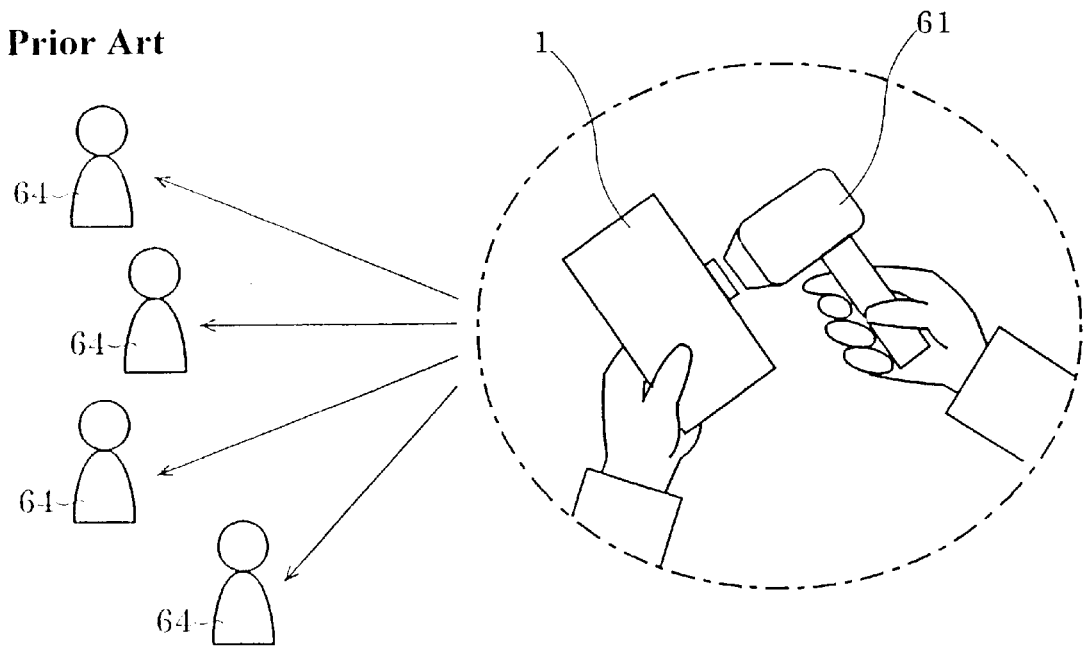
FIG. 24 is an explanatory diagram which shows placing price tags.

FIG. 24 is an explanatory diagram which shows putting price tags in comparison with a conventional art. As shown in the diagram, conventionally, in arranging articles on article shelves in a store, each clerk 64 puts price tags on the articles using the labeler 61. Since in most case there is not left much time of period between the receipt time and the arrangement time, this operation needs to involve many clerks 64 simultaneously. This requires a larger number of labelers 61 and price tags, many of which might be not employed. There may also arise errors in putting price tags on articles or filling in slips. The tag processing system avoid such troubles.

Figure 25:
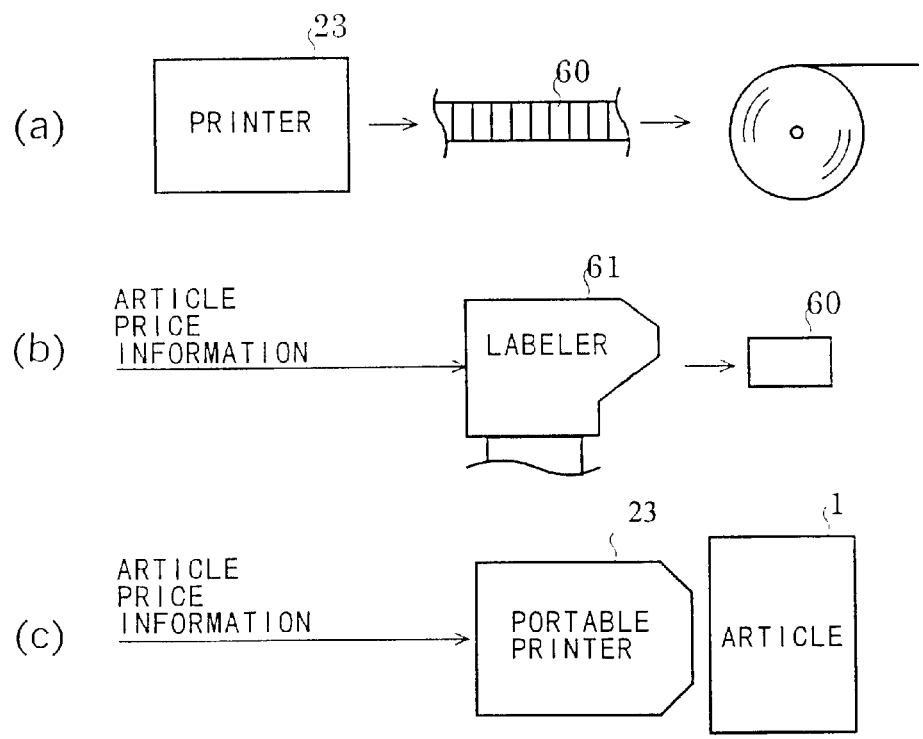
FIGS. 25(a)–(c) are explanatory diagrams showing the improvement of the price tag processing system.

FIGS. 25(a)–(c) are explanatory diagrams showing the improvement of the price tag processing system according to the present invention. As shown in FIG. 25(a), upon receipt of necessary article price information, the printer 23 prints the article prices and the store names. In addition, as shown in FIG. 25(b), as long as the labeler 61 is constituted so as to set the price information upon receipt of a given signal, it is possible to configure in such a manner that the price information is provided to the labeler 61, which automatically sets the prices to issue the labels 60. Further, as shown in FIG. 25(c), it may possible that the price information is provided to the portable printer 23, and the printer directly prints the prices on the articles 1.

As described above, in the tag processing system, in delivering the articles from the warehouse, checking articles and issuing prices tags are performed at the same time for the purpose of putting the prices tags on the articles, whereby the store does not require to prepare a large number of labelers and price tags. Since it is possible to set the article prices and put the price tags on the articles, which can avoid errors associated with a variety of human careless operation.

<Sixth Embodiment>

Figure 26:
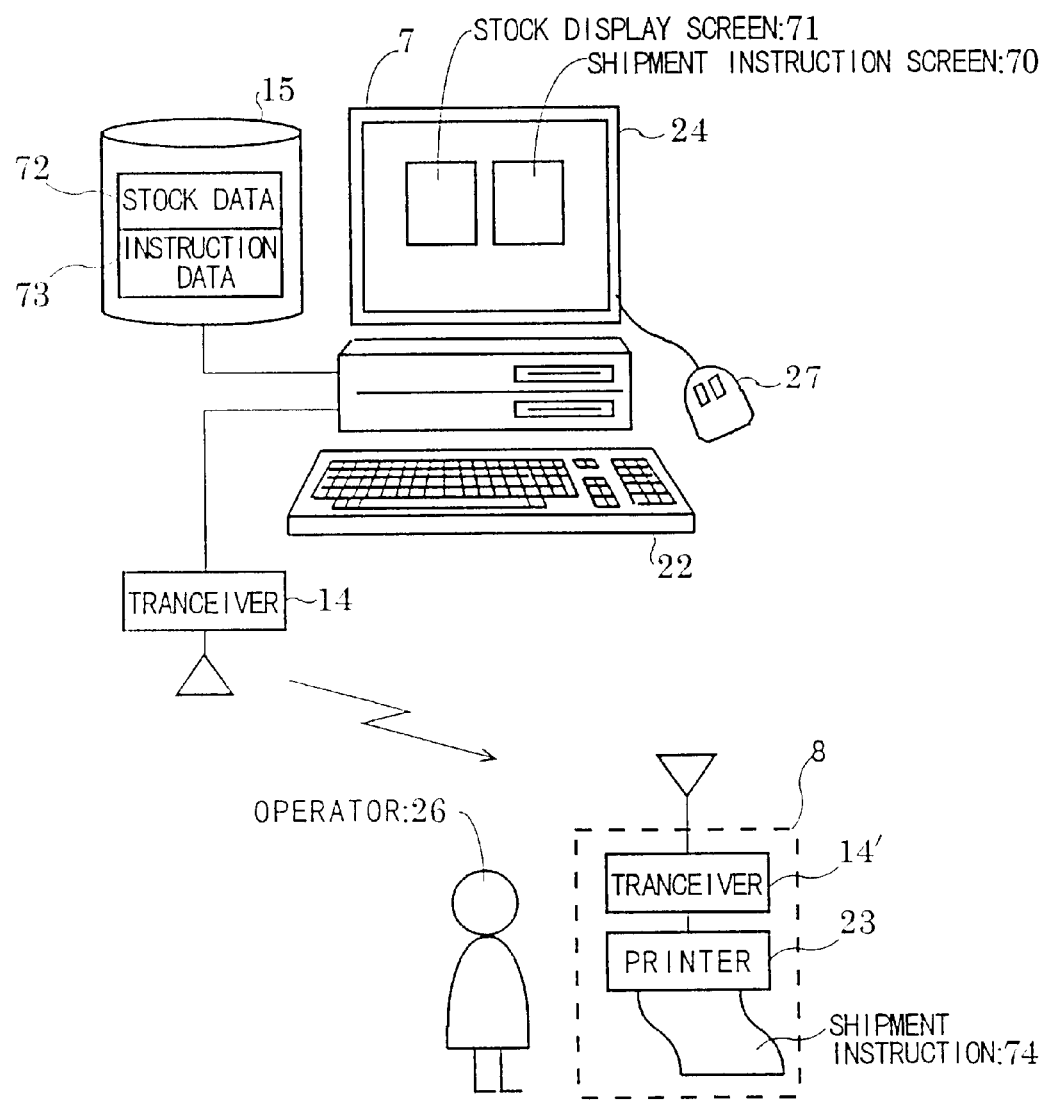
FIG. 26 is a schematic diagram showing the sixth embodiment of the warehouse managing system.

Hereinafter, the sixth embodiment of the warehouse managing system of the present invention will be now described. FIG. 26 is a schematic diagram showing the sixth embodiment. The warehouse managing system gives shipment instructions of articles stored in the warehouse using the management terminal 8. The host computer 7 incorporates the keyboard 22, and the display 24. To carry out a variety of operations over the display 24, the pointing device 27, for example, a mouse is provided. The host computer 7, which may be a main body in a well-known personal computer, for example, includes a variety of components such as a CPU (Central Processing Unit), a storage unit, and a hard disk.

The storage unit 15, which is set in the host computer 7 or serves as an external hard disk, stores the stock data 72 and the shipment instruction data 73. These data are constituted in form of a relational database, for example. The display 24 indicates the shipment instruction screen 70, the stock display screen 71, and the OK button 1C for clicking after completion of a given operation, which will be described later.

To the host compute 7 is connected the transceiver 14 which transmits, for example, shipment instruction data via the antenna 25 to the terminal 8 operated by the operator 26. The terminal 8 incorporates transceiver 14' and the printer 23. The shipment instruction data received using the transceiver 14' is printed by the printer 23, whereby the shipment instruction is issued. The operator 26 picks up articles with reference to the shipment instruction 74 to ship them.

Figure 27:
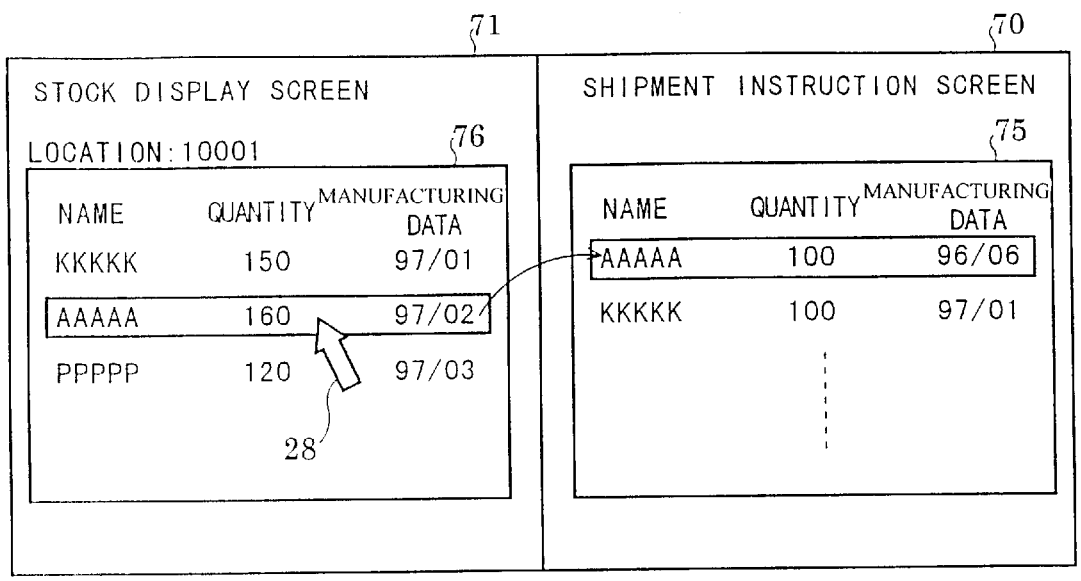
FIGS. 27(a) and (b) show the shipment instruction screen and the shipment display screen.
Figure 27:
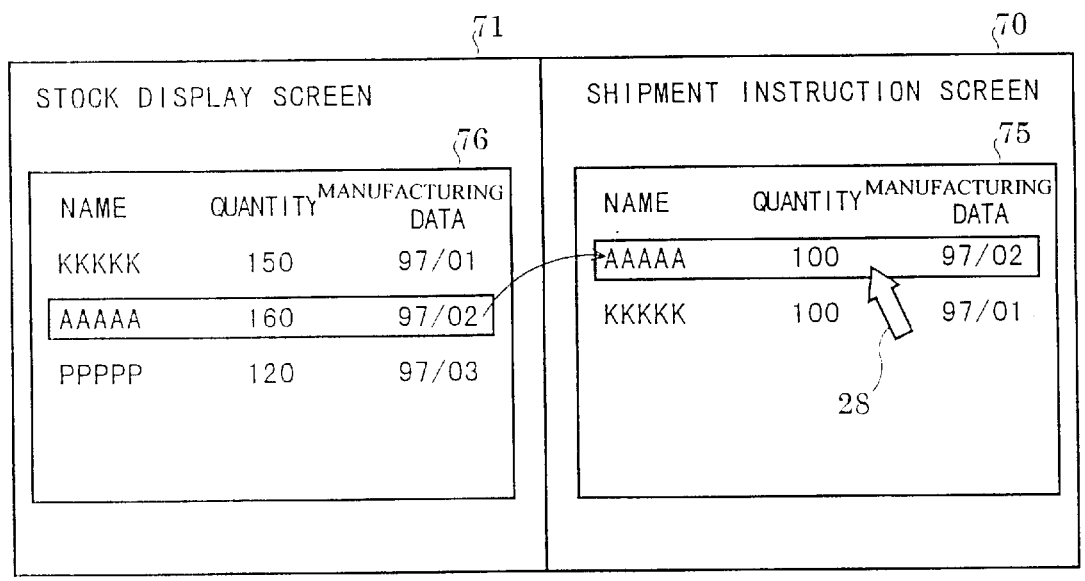

FIGS. 27(*a*) and (*b*) show the shipment instruction screen 70 and the stock display screen 71, both of which depict them before or after dragging, respectively. Herein, dragging is defined as an operation to specify an object pressing a mouse button, move the object to a destination, and release the mouse button.

According to the present invention, first, the shipment instruction screen 70 is prepared on the basis of the shipment instruction data which is prepared upon receipt of the article order. Conventionally, preparing a shipment instruction based upon the shipment instruction data which has been prepared at receipt of article order when shipping actually, might cause some troubles, such as lack or absence of articles which should be stored. Therefore, in accordance with the invention, the shipment instruction is issued after experiencing adjustment or correction referring to such a screen immediately prior to actually picking up the articles from the warehouse.

The stock display screen 71 is prepared on the basis of the stock data 72 which indicates the contents of the articles stored in the warehouse at real-time. The shipment instruction screen 70 involves attribute data 75, such as customer names, article names, quantities of articles, and manufacturing dates, whereas the stock display screen 71 involves the attribute data 76 likewise.

As shown in FIG. 27(*a*), the shipment instruction screen 70 requests to pick up "one hundred" of articles "AAAAA" manufactured on "June 1996." However, the stock display screen 71 shows that one hundred and sixty of articles "AAAAA" manufactured on "February 1997", which indicates that articles manufactured before February 1997 have been already shipped.

In this case, in the stock display screen 71 in the display 24, dragging with respect to the articles "AAAAA" is carried out using the pointing device 27. More specifically, both of the articles "AAAAA" in the stock display screen 71 and the articles "AAAAA" in the shipment instruction screen 70 are designated with the pointer 28.

After designation of the articles, the host computer 7 writes the attribute data except the quantity in the stock display screen 71, on the attribute data corresponding thereto in the shipment instruction screen 70. That is to say, the attribute data associated with the designated articles in the shipment instruction screen 70 is replaced. Consequently, in the shipment instruction display 70 shown in FIG. 27(*b*), the quantity "one hundred" of the articles is left while the manufacturing date thereof is updated to "February 1997", whereby the updated shipment instruction data including the manufacturing data is stored into the storage unit 15. Thereby, the shipment instruction containing the contents similar to the shipment instruction screen 70 shown in FIG. 27(*b*) is printed by the printer 23.

Figure 28:
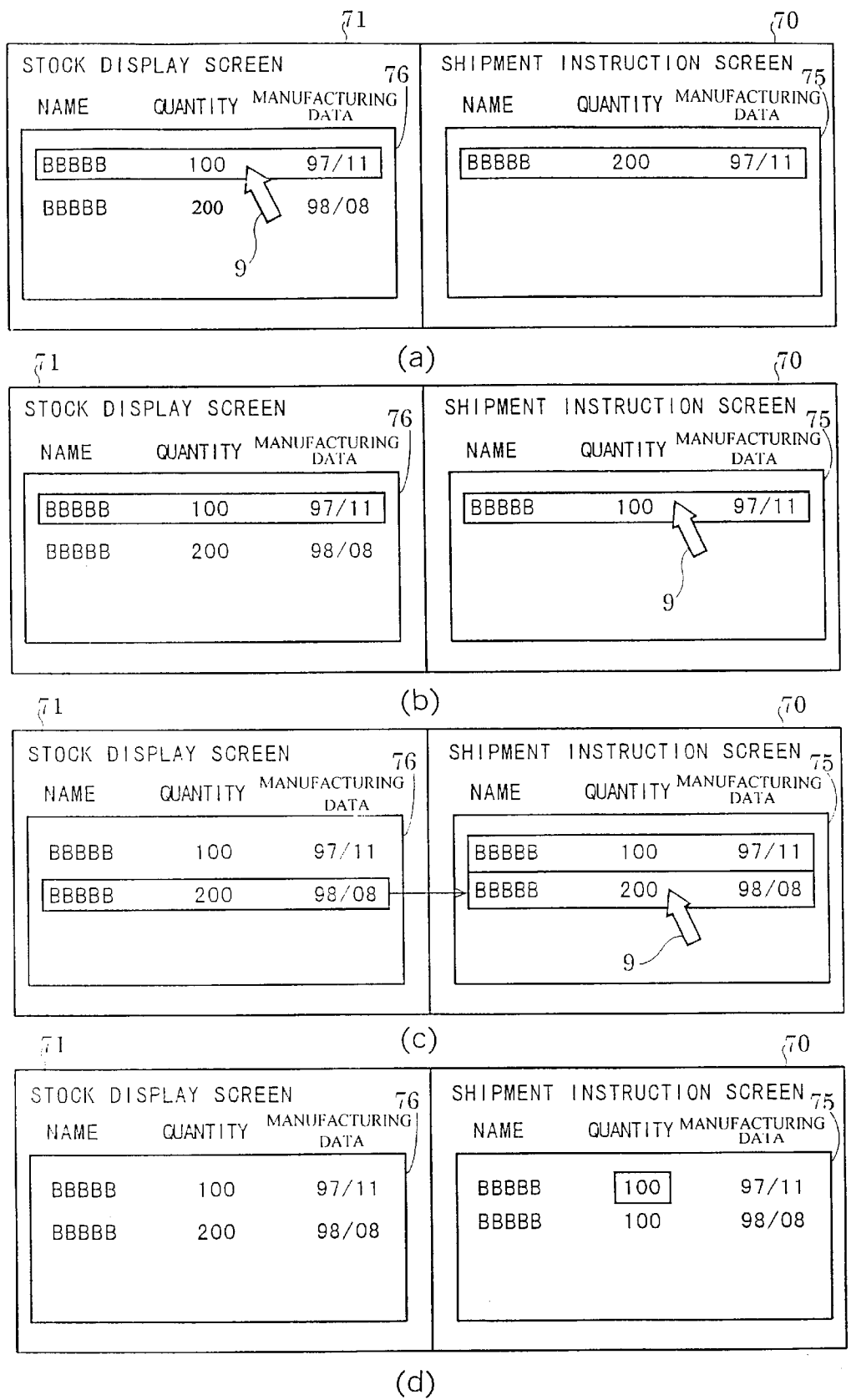
FIGS. 28(a)–(d) are explanatory diagrams showing how the operation differs from the operation in FIG. 27.

FIGS. 28(*a*)–(*d*) are explanatory diagrams showing the operation different from the operation in FIG. 27. FIG. 28(*a*) shows the shipment instruction screen 70 and the stock display screen 71 on the basis of the original shipment instruction data. The shipment instruction screen 70 requests to ship two hundreds of articles "BBBBB" manufactured on "November 1997", whereas the stock display screen 71 indicates that only "one hundred" of articles "BBBBB" manufactured on "November 1997" are stored but "two hundreds" of the same articles manufactured on "August 1998" are stored. In this case, dragging the above articles is performed between the stock display screen 71 and the shipment instruction screen 70, whereby the contents of the articles in the shipment instruction screen 70 is replaced with the contents of the articles in the stock display screen 71.

However, there still remains a deficiency of one hundred of the articles "BBBBB." Therefore, another dragging is carried out. More specifically, as shown in FIG. 28(*c*), dragging the same articles manufactured on a different date "August 1998" in the stock display screen 71 is executed, which generates contents thereof in the shipment instruction screen 70. Thereafter, the quantity of the articles is corrected to "one hundred" in the shipment instruction screen 70, which is carried out by the operator at the management terminal 8.

In summary, replacing the attribute data in the shipment instruction screen 70 as shown in FIGS. 28(*c*) and (*d*) corrects the shipment instruction data, which may be automatically carried out at the dragging operation shown in FIG. 28(*c*).

The above process is carried out through a program stored in the host computer 7. Replacing the content of articles including designating articles in the stock display screen 71 and dragging over the shipment instruction screen 70 is similar to operations using windows employed in widely used personal computers, which is easy to practice.

Figure 29:
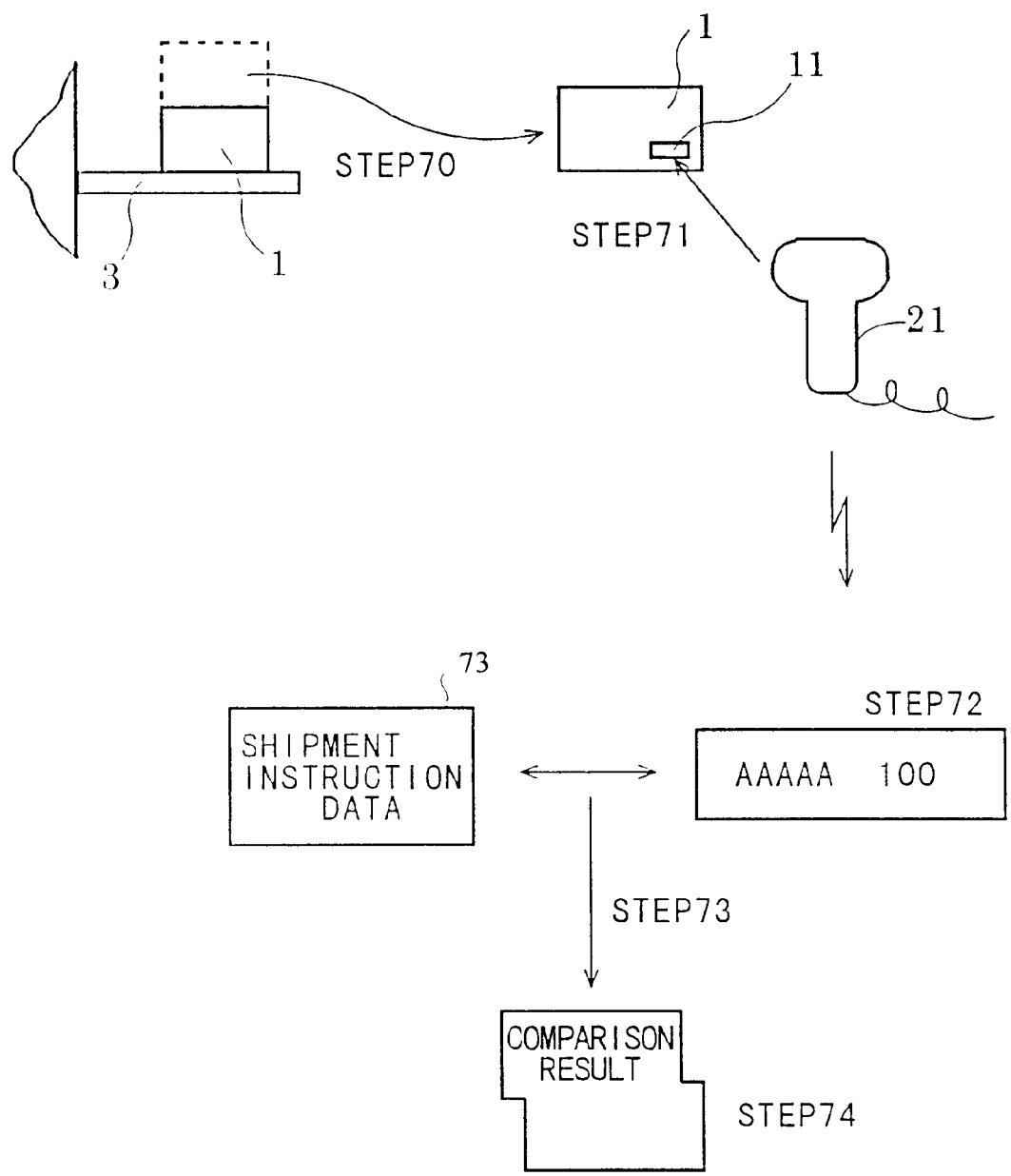
FIG. 29 is an explanatory diagram showing the configuration of a pick-up operation.

FIG. 29 is an explanatory diagram showing the confirmation of pick-up operation. Hereinbelow, the procedure that the shipment instruction is issued and the operator confirms the result of shipping on the basis of the contents thereof.

As shown in the diagram, on the shelf 3 are stacked the articles 1. The shelf 3 is installed on the wall of the warehouse, for example, wherein picking up the articles are performed manually or using a forklift or the like, at the step 70.

At the step 71, the scanner 21 scans the article code 11 put on the side of the picked article 1. The article code 11 contains article names and attribute data on the articles. After scanning of the article code by the scanner 21, the scanned data is sent to the management terminal 8 as the pick-up information.

The management terminal 8 adds up the received information, at the step 72, thus preparing for the data which represents that one hundred of article "AAAAA" are picked up, for example, whereby the resultant denoting the number of articles which have been picked up is compared with the shipment instruction data 73, at the step 73. At the step 74, the result is output by the printer connected to the management terminal 8. The output of the comparison result may be indicated on the display 24.

As described above, in accordance with the sixth embodiment of the warehousing managing system, the shipment instruction data having errors in attribute data can be automatically corrected by referring to the stock display screen, which promptly prepares real-time stock data suitable for the correct shipment instruction. Further, feedback of the resultant of confirming the picked articles and comparison thereof with the shipment instruction data enables judging whether or not the shipment is made without error accurately.

<Seventh Embodiment>

Figure 30:
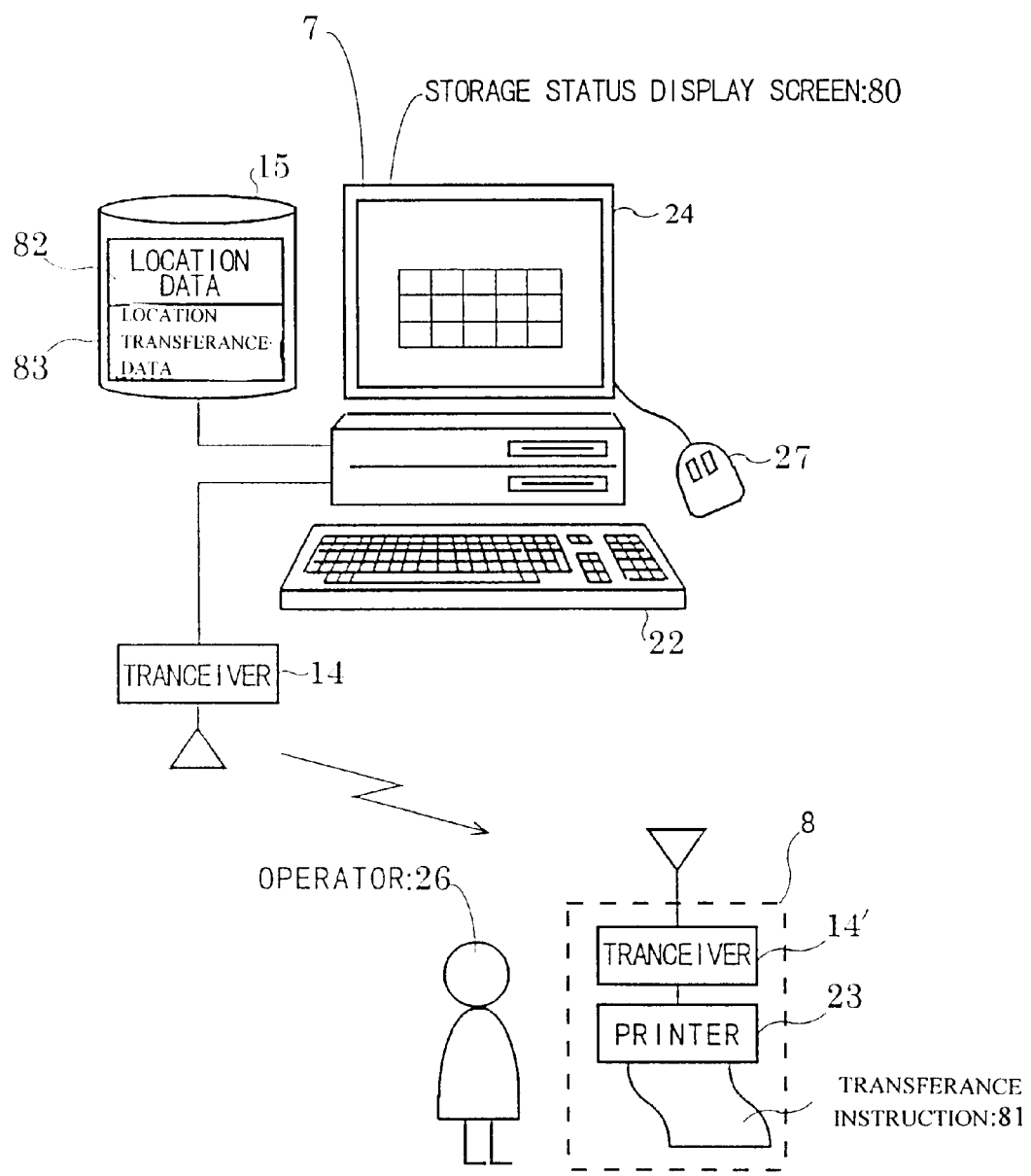
FIG. 30 is a schematic diagram showing the seventh embodiment of the warehouse managing system.

FIG. 30 is a schematic diagram showing the seventh embodiment of the warehouse managing system. In the embodiment, dragging the attribute information on the articles over the screen makes it possible to transfer the articles in the warehouse. The display 24 indicates the storage status display screen 80 while the storage unit 15 stores the location data 82 and the location transference data 83.

The space of the warehouse is divided by a given space into a plurality of locations, each of which is referred to using the unique number. Each of the locations has the location data 82 which includes the above number and data on the articles laid in the location. Transferring the articles from a location to another location is carried out using the storage status display screen 80 on the display 24. The contents of the transference is stored into the storage unit 15 as the location transference data 83.

The data is deleted after completion of transferring the articles actually. The location transference data 83 is sent to the terminal 8 handled by the operator 26 via the transceiver 14, similarly to the sixth embodiment. The contents of the data is printed by the printer 23 as the transference instruction 15. Referring to the transference instruction 81, the operator 26 moves the necessary articles using a forklift or the like.

Figure 31:
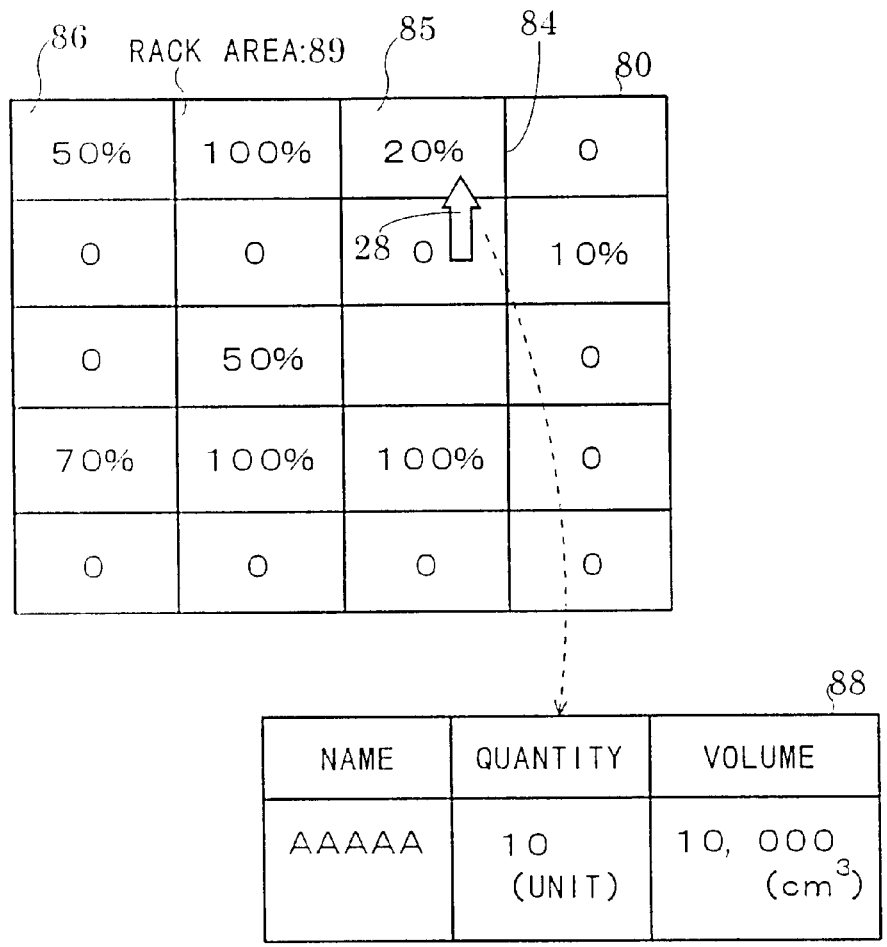
FIGS. 31(a) and (b) are explanatory diagrams which show transferring the articles on a shelf.
Figure 31:
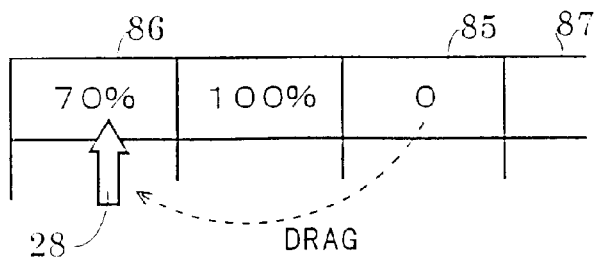

FIGS. 31(*a*) and (*b*) are explanatory diagrams which show transferring the articles laid on a shelf. As shown in the figure, the display 24 illustrates the storage status display screen 80 in a transference operation, wherein the storage status display screen 80 shows the status of the articles laid on a rack, for example. Herein, the location is defined as the rack area surrounded by the lattice 84. In each of the locations are laid the articles, wherein the storage status display screen 80 shows the ratio of the articles to the capacity of the location. For example, in the location 86 are stored the articles corresponding to 50% of the capacity of the location 86. Here, for example, clicking of the location 85 using the pointer 28 shows the article list 88 concerning the articles stored in the location 85, wherein the articles list 88 illustrates names, quantities, and volume of the articles.

Pursuant to such a screen, the operator confirms the storage status of the articles to consider transferring the articles, objects of which involve, for example, to receive new articles, to classify the articles, and to arrange the articles for first-in & first-out management.

Transferring articles from a location to another location is carried out as following. In case of transferring the articles from the location 85 to the location 86, dragging the articles therebetween is executed using the pointer 28. More specifically, specifying the articles in the location 85, moving the articles to the location 86, and releasing the article in the location are implemented. Through such processing, the articles are moved from the location 85 to the location 86, whereby the data on the location 86 is updated from 50% to 70% in screen display 87, as shown in FIG. 31(*b*). In this way, transferring articles is freely carried out for arrangement thereof.

Thus, the articles are virtually transferred on the screen. In fact, however, the articles are left in the original location, for example, in the location 85. The location transference data 83 shown in FIG. 30 stores information on such a transference operation. The contents of the location transference data 83 is employed in the actual transference operation as the transference instruction 81.

Figure 32:
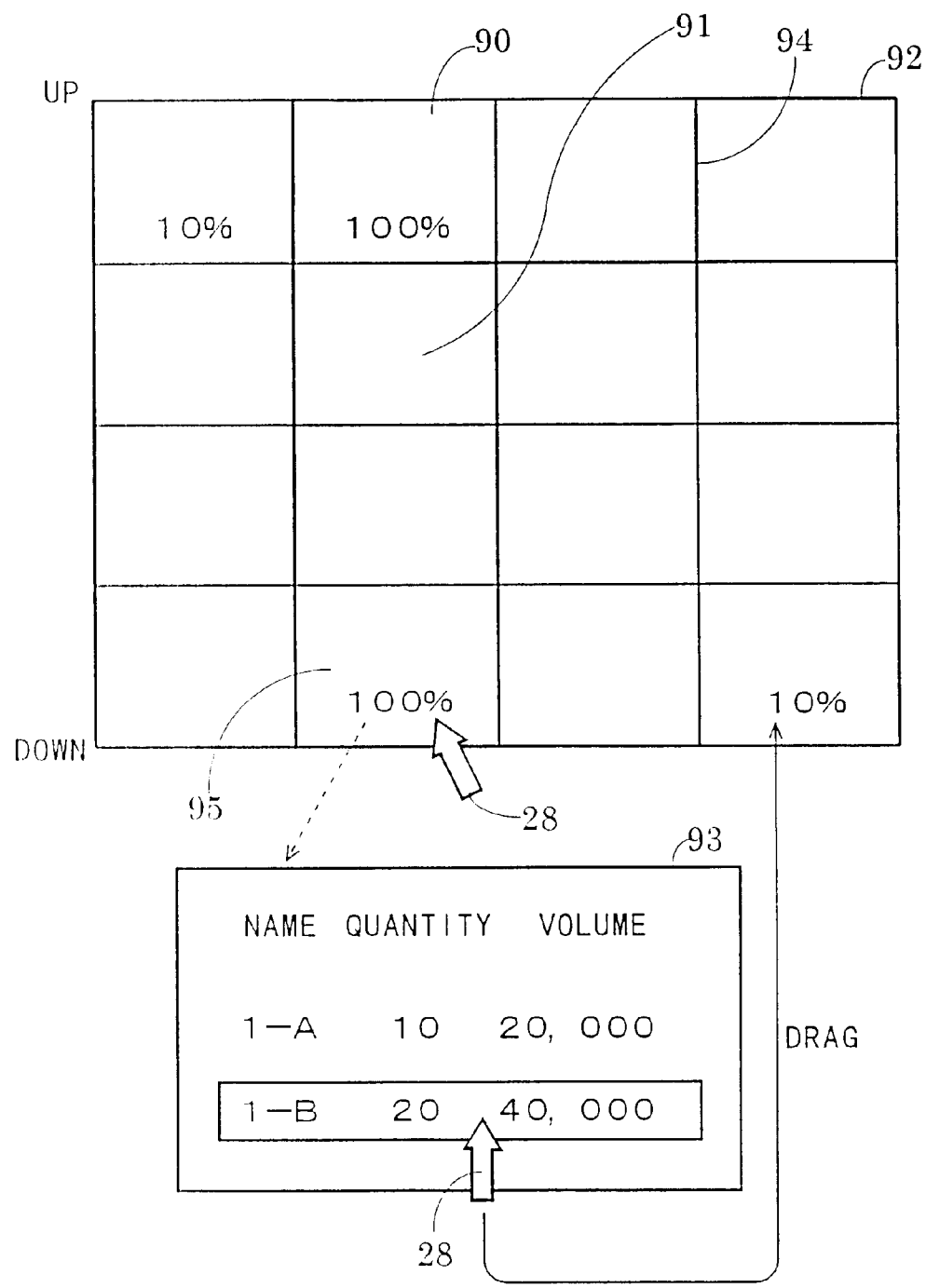
FIG. 32 is an explanatory diagram which shows moving the article up or down.

In contrast with transferring the articles stacked on the racks as shown in FIGS. 31(*a*) and (*b*), transferring the articles within the same location will be described, hereinafter. FIG. 32 is an explanatory diagram which shows moving the articles up or down. In this case, the display shows the storage status display screen 92. In the storage status display screen 92, each of the regions is surrounded by lattices 94, which indicates that the articles laid in the region 90 are vertically stacked on the articles laid on the region 91, for example.

Herein, moving the pointer 28 to the region 95 to click it shows the articles list 93 as illustrated above, which indicates that there are laid ten articles 1-A, twenty articles 1-B in the region 95. Similarly to the above, all of the articles laid in a location can be transferred to another location as shown in FIG. 31. On the other hand, for example, the article list 93 is shown, a specific article shown in the articles list is designated, and the article is moved. In this way, the articles can be transferred by article in FIG. 32.

In the cases of FIG. 31 and FIG. 32, the attribute data on the article laid in the origination place is involved in the attribute data on the article laid in the destination place, whereby the location data 82 is updated through addition or the like. The contents of the location data transference data 83 becomes the contents denoting the number of the articles to be transferred and the origination place and the destination place thereof.

Figure 33:
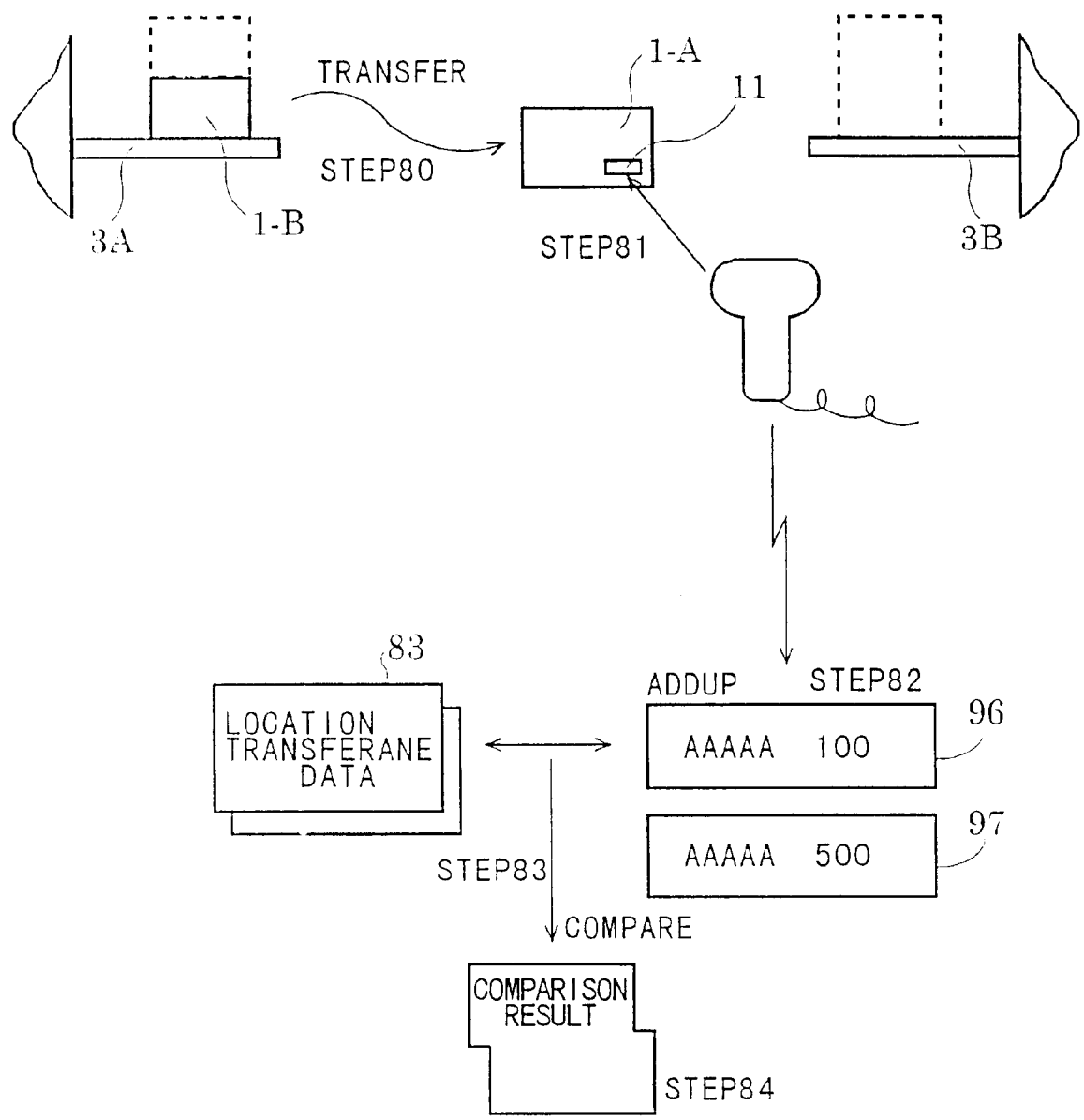
FIG. 33 is a explanatory diagram showing the procedure of transferring and confirming the articles.

FIG. 33 is an explanatory diagram showing the procedure of transferring and confirming the articles using the instruction. For example, the shelf 3A stores the articles 1A and 1B. Pursuant to the contents of the transference instruction in step 81, the article 1A is moved to another shelf 3B, at the step 80. Thereafter, the article code 11 put on the side of the article 1A to be transferred is read by the scanner 21. The articles 1A is scanned on the shelf 3A, and after transference, is scanned on the shelf 3B as well as the shelves 3A and 3B themselves are scanned, thereby giving the transference information on the type of the article to be transferred and the places from/to which the article is transferred.

At step 82, the received information is added-up. At step 83, the added-up data is compared with the shipment instruction data, and the comparison results are output at step 84. In case where the articles fail to be transferred from a shelf to another shelf at one time, several transference are carried out to add up the results of the transference. The article list 96 of the origination shelf and the article list 97 of the destination shelf are identified with the location transference data 83 or the location data 82 shown in FIG. 30, which enables judging whether the transference is accurately carried out on the basis of the location instruction or not. The process and the contents of the judgment is the same as those of the above embodiment.

As described above, this embodiment displays the stock status display screen on the display, implements transferring the articles on the screen by referring to the location or the region which stores them, stores the result thereof in the location transference data 83, and preparing the transference instruction, whereby the confirming the article stock status of the warehouse and scheduling the article transference can be carried out readily. Further, the result is quickly notifies to the operator, which starts the transference operation. Moreover, identifying the transference operation result enables accurate management of warehousing.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A warehouse managing system. comprising:
   a display displaying a shipment instruction screen that is prepared for shipment instructions, and is indicative of attribute data including names of articles, a quantity of each article, and a preferred manufacturing date of each article to be shipped, and a stock display screen that is indicative of attribute data including names of articles, a quantity of each article, and an actual manufacturing date of each article actually stored in the warehouse;

a pointing device specifying an object for operation on the screen displayed in the display; and a controller that modifies the shipment instruction screen by substituting attribute data for an article in the shipment instruction screen with the attribute data of an article specified with the pointing device in the stock display screen, and preparing shipment instruction data for shipment instructions.

2. A warehouse managing system as set forth in claim 1, wherein the controller prepares the shipment instruction data, and allows a terminal, monitored by an operator picking up the articles in the warehouse to display the shipment instruction data.

3. A warehouse managing system as set forth in claim 2, wherein the controller compares information on the articles actually picked up in the warehouse pursuant to the shipment instruction data, with the shipment instruction data, and outputs a comparison result.

4. A transporter allocating system comprising:

a display screen displaying a plurality of first symbols denoting transporters for collection and delivery of articles and being allocated so that each transporter travels along a predetermined route for collection and delivery, the screen further displaying at least one of a plurality of second symbols denoting a route for collection and delivery allocated to each respective transporter for collection and delivery of the articles, and displaying at least one of a plurality of third symbols denoting a collection place or a delivery place corresponding thereto, wherein at least one of the second symbols has a plurality of third symbols connected therewith, in a tree-like arrangement;

a pointing device acting upon the symbols on a display screen so as to move the symbols; and a calculator acquiring a display position of each of the symbols and a change in event of the display position and carrying out a given arithmetic operation, wherein the calculator acquires the change in event when one of the first, second and third symbols is transferred on the display to change a relation therebetween, updates transporter allocation management data denoting articles loaded on each of the transporters for collection and delivery thereof, and displays a result.

5. A transporter allocating system, comprising:

a display screen displaying a plurality of first symbols denoting transporters for collection and delivery of articles and being allocated so that each transporter travels along a predetermined route for collection and delivery, the screen further displaying at least one of a plurality of second symbols denoting a route for collection and delivery allocated to each respective transporter for collection and delivery of the articles, displaying at least one of a plurality of third symbols denoting a collection and delivery destination, and displaying a plurality of fourth symbols denoting an article for collection and delivery as attribute data on the collection destination or the delivery destination, wherein at least one of the second symbols has a plurality of third symbols connected therewith, and wherein at least one of the third symbols has a plurality of the fourth symbols connected therewith, in a tree-like arrangement;

a pointing device acting on the symbols on the display screen so as to move the symbols; and a calculator acquiring a display position of each of the symbols and a change in event of the display position, and carrying out a given arithmetic operation, wherein the calculator acquires the change in event when one of the first, second and fourth symbols is transferred on a display to change the relation therebetween, updates transporter allocation management data denoting articles loaded on each of the transporters for collection and delivery and shipping data thereof, and displays a result.

* * * * *